(12) United States Patent
Lee

(10) Patent No.: US 7,492,741 B2
(45) Date of Patent: Feb. 17, 2009

(54) SPACE-TIME MULTIPATH SEARCHER

(75) Inventor: Jung A. Lee, Pittstown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1065 days.

(21) Appl. No.: 10/822,478

(22) Filed: Apr. 12, 2004

(65) Prior Publication Data

US 2005/0259621 A1 Nov. 24, 2005

(51) Int. Cl.
H04B 7/02 (2006.01)
H04B 1/38 (2006.01)
H03D 1/00 (2006.01)

(52) U.S. Cl. .................. 370/335; 455/273; 455/278.1; 455/562.1; 375/343

(58) Field of Classification Search ................. 370/335, 370/342; 455/67.16, 63.4, 63.1, 69, 277.1, 455/277.2, 278.1, 289, 296, 561, 562.1, 273; 375/134, 136, 137, 142, 145, 147, 150, 343

See application file for complete search history.

(56) References Cited

U.S. PATENT DOCUMENTS

| 6,108,323 | A * | 8/2000 | Gray ........................... 370/335 |
| 7,181,244 | B2 * | 2/2007 | Judson et al. ............. 455/562.1 |
| 7,321,645 | B2 * | 1/2008 | Lee et al. ..................... 375/343 |
| 2004/0009791 | A1 * | 1/2004 | Hiramatsu ................... 455/561 |
| 2004/0165684 | A1 * | 8/2004 | Ketchum et al. ............ 375/343 |
| 2005/0113141 | A1 * | 5/2005 | Felter ....................... 455/562.1 |

* cited by examiner

Primary Examiner—Blane J Jackson

(57) ABSTRACT

The present invention provides a method of multipath searching using a signal transmitted by a source and received by a plurality of antennae. The method includes subjecting at least one control bit in at least one received signal to temporal processing, subjecting the at least one control bit in the received signal to spatial processing, and determining a time delay and a direction associated with the source based upon the temporal processing and the spatial processing.

20 Claims, 17 Drawing Sheets

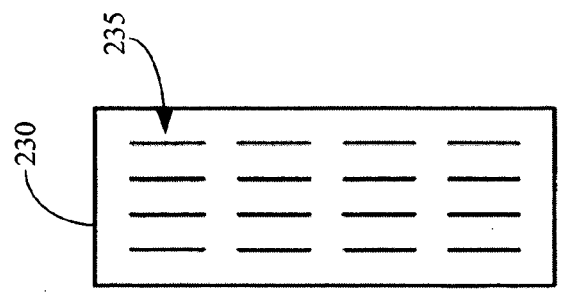
Figure 2D ULA-4V
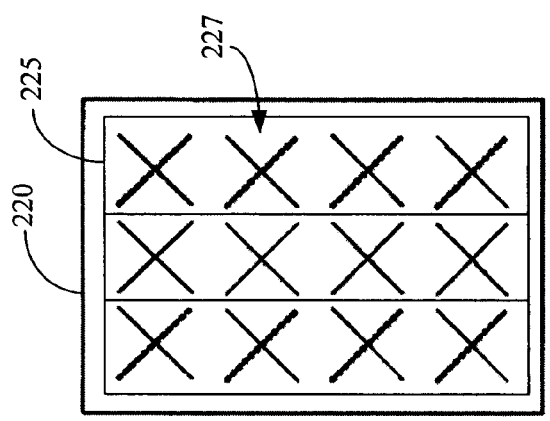
Figure 2C CLA-3X
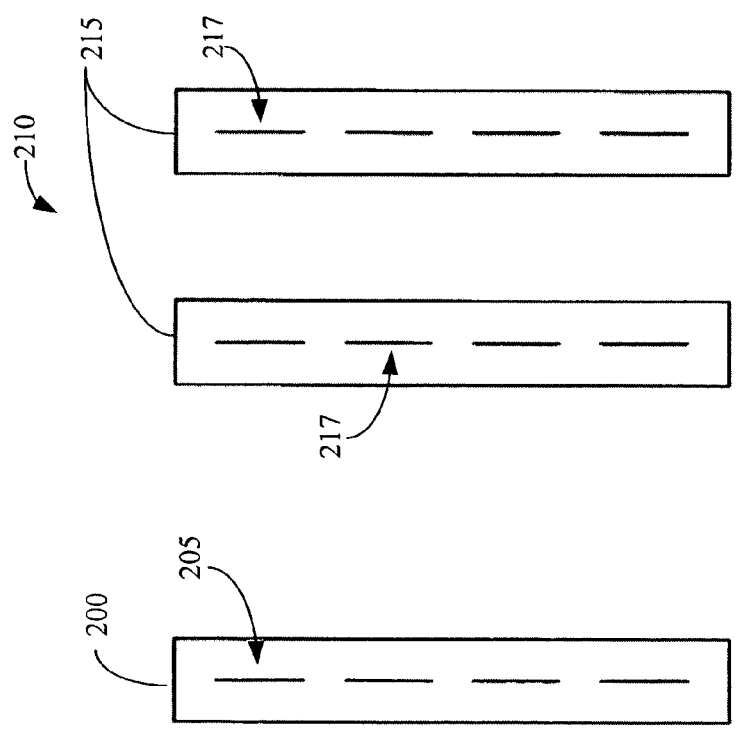
Figure 2B DIV-2
Figure 2A V-1

SPACE-TIME MULTIPATH SEARCHER

BACKGROUND OF THE INVENTION

1. Field of the Invention

This invention relates generally to a wireless communication system, and, more particularly, to wireless communications s.

2. Description of the Related Art

The list of devices that use wireless communication techniques to transmit voice and data signals has expanded dramatically in recent years to include, among other things, cell phones, personal data assistants, global positioning system receivers, laptop computers, and desktop computers. And the number of devices on the list, as well as the services they are likely to provide, is expected to continue to grow. The proliferation of wireless communication systems has led users to expect to access these systems at virtually any time and in virtually any place. However, before any voice or data information can be transmitted via a wireless communication system, the wireless device (sometimes referred to as a user equipment, or UE) and a base station (sometimes referred to as a Node-B) should establish a communication channel.

To establish the communication channel, the UE typically transmits a known sequence, such as a sequence containing a series of symbols, on an access channel that is monitored by a receiver at the Node-B. The Node-B receiver detects the known sequence and uses it for functions such as estimating the round-trip time delay between the UE and Node-B. For communications systems governed by the Universal Mobile Telecommunications System ("UMTS") standard, a random access transmission procedure may be employed so that multiple UEs can share the same physical resources when establishing communication channels with a Node-B of a given cell. The Random Access Channel (RACH) is a common uplink physical channel that carries one or more preamble sequences and one or more message parts.

The random access transmission includes a RACH preamble transmission followed by a message. For example, in a communication system governed by UMTS, a RACH preamble transmission may be 4096 chips long and consist of 256 repetitions of length 16 Walsh-Hadamard preamble sequence signatures. The Node-B receiver may detect the RACH preamble by correlating the received signal with a scrambling code and an expected signature sequence. Since the received preamble signal is delayed by the round-trip propagation time between the Node B and the UE, with respect to Node B transmit time, the Node-B receiver searches over a time range, or search window, corresponding to an expected range of possible round-trip delays between the Node B and the UE, which may be located anywhere within the cell served by the Node-B. For example, the Node-B receiver may search a 1280-chip search window, which may correspond approximately to the possible locations of the UE within a cell having a 50-kilometer radius around the Node-B. A preamble is detected and the signature sequence corresponding to a transmitted signature is found when the correlation energy exceeds a certain predefined threshold.

The resolution of the time search performed by the Node-B receiver to detect the RACH preamble is coarse, e.g. at a half-chip resolution, which is not typically accurate enough to permit synchronization of the UE and Node-B signals. Accordingly, the Node-B may also include a multipath searcher, which may determine an increased-accuracy round-trip time delay that may allow synchronization in a time-varying mobile channel environment. For example, the multipath searcher may determine a power delay profile by searching for pilot sequence and/or one or more control bits in a 128-chip window centered on the round-trip delay time estimated using the RACH preamble. The increased-accuracy round-trip delay time and/or power delay profile may then be used to assign the appropriate RAKE fingers. However, conventional multipath searchers do not utilize or provide spatial information, such as an angle of arrival of the signal from the UE to the Node-B. Thus, conventional multipath searchers may not be able to take advantage of many features of beam-forming antenna systems, such as increased transmission accuracy, sensitivity, power, and the like. Moreover, the failure to use spatial information may reduce the accuracy of the round-trip delay time and/or power delay profile in regions characterized by channels with small angle spread.

The present invention is directed to addressing the effects of one or more of the problems set forth above.

SUMMARY OF THE INVENTION

In one embodiment of the instant invention a method of multipath searching using a signal transmitted by a source and received by a plurality of antennae is provided. The method includes subjecting at least one control bit in at least one received signal to temporal processing, subjecting the at least one control bit in the received signal to spatial processing, and determining a time delay and a direction associated with the source based upon the temporal processing and the spatial processing.

In another embodiment of the present invention, a method of multipath searching using a signal transmitted by a source and received by a plurality of antennae is provided that includes forming a first signal by spatially processing at least one control bit in at least one received signal based upon at least one angle, forming a second signal by temporally processing the first signal, and determining a time delay and a direction associated with the source based upon the second signal.

In yet another embodiment of the present invention, a method of multipath searching using a signal transmitted by a source and received by a plurality of antennae is provided that includes forming at least one first signal by temporally correlating at least one control bit in at least one received uplink signal, forming a second signal by spatially processing the at least one first signal based upon at least one angle, and determining a time delay and a direction associated with the source based upon the second signal.

In yet a further embodiment of the present invention, a method is set forth that includes providing a first signal having at least one control bit such that a control unit receiving the first signal at a plurality of antennae is capable of determining a time delay and a direction associated with the first signal based upon temporally processing and spatially processing the received first signal.

BRIEF DESCRIPTION OF THE DRAWINGS

The invention may be understood by reference to the following description taken in conjunction with the accompanying drawings, in which like reference numerals identify like elements, and in which:

FIGS. 2A, 2B, 2C, and 2D illustrate exemplary configurations V-1, DIV-2, CLA-3X, and ULA-4V of an antenna array that may be used to form the communication channel shown in FIG. 1.

Figure 1:
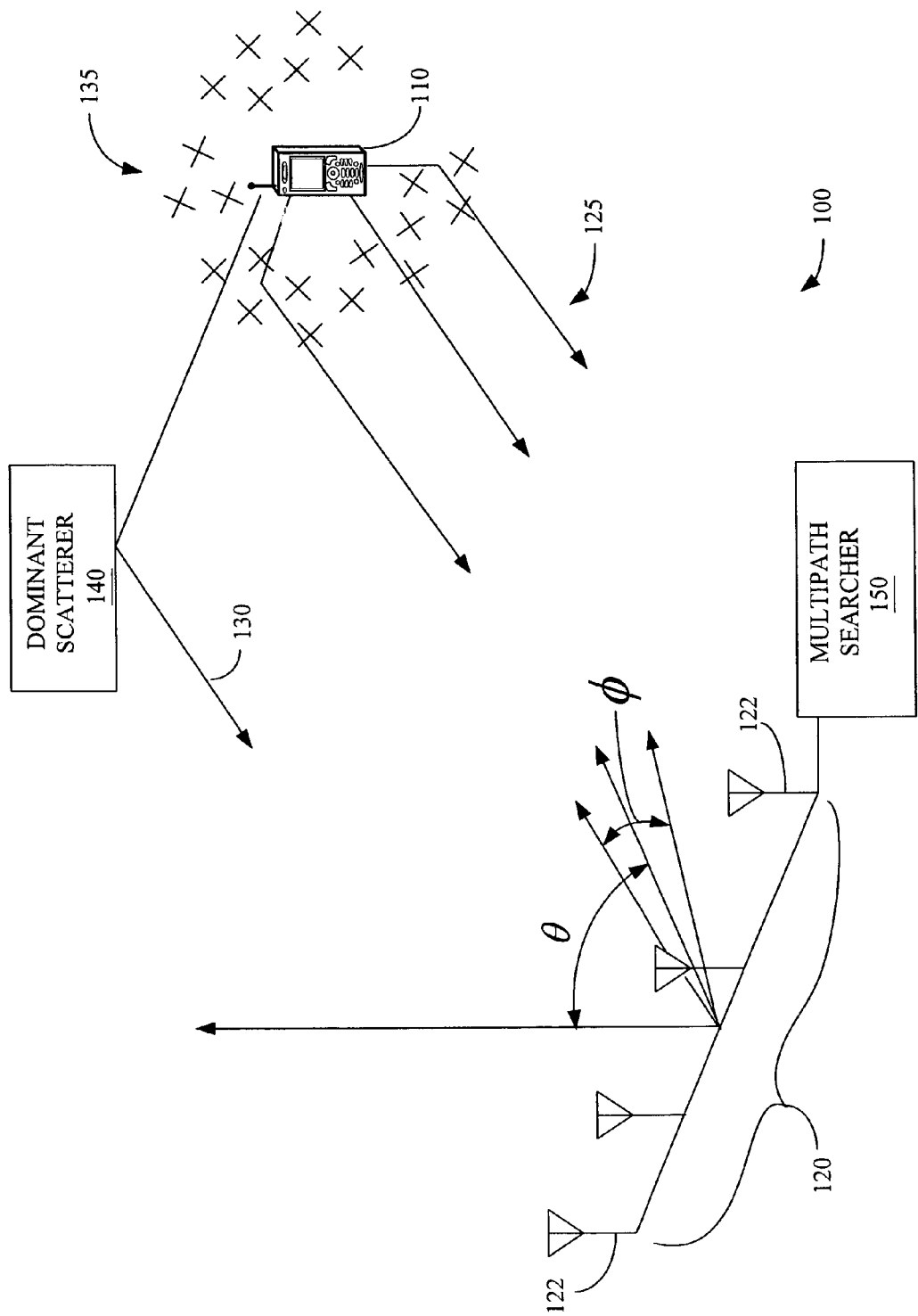
FIG. 1 conceptually illustrates one embodiment of a geometrical model of an exemplary communication channel.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates one embodiment of a geometrical model of an exemplary communication channel 100 that may be formed between a mobile station 110 and an antenna array 120, which may include one or more antennae 122. In the illustrated embodiment, the mobile station 110 is a mobile phone. However, in alternative embodiments, the mobile station 110 may be any device capable of communicating with the antenna array 120 using the communication channel 100. For example, the mobile station 110 may be a personal data assistant, a Global Positioning System receiver, a laptop computer, a desktop computer, a wireless modem, and the like.

FIGS. 2A through 2D illustrate exemplary configurations of the antenna array 120. FIG. 2A illustrates a V-1 antenna configuration 200, which may be embodied by a single antenna 205 with vertical polarization. FIG. 2B illustrates a DIV-2 configuration 210 composed of two widely spaced antenna columns 215, each including a single antenna 217. The term "widely spaced," as used herein and in accordance with common usage in the art, will be understood to refer to antenna arrays including a plurality of antennae and/or antenna elements that are separated by a distance that is large compared to a characteristic wavelength of a signal that is transmitted or received by the antennae. For example, the spacing between the antenna columns 215 in the illustrated DIV-2 antenna configuration 210 may be approximately ten times as large as a central wavelength of a wave band that may be transmitted or received by the antenna columns 215 in the DIV-2 antenna configuration 210.

FIG. 2C illustrates a clustered linear array (CLA-3X) antenna configuration 220, which includes a plurality of antenna elements 225 formed from a plurality of individual antennae 230. Although the CLA-3X antenna configuration 220 shown in FIG. 2C includes three antenna, elements 225 each comprised of four crossed antennae 227 that include a portion with a horizontal polarization and a portion with a vertical polarization, the present invention is not limited to this specific configuration. In alternative embodiments, any desirable number of antenna elements and/or individual antennae may be used. Moreover, in some alternative embodiments, the CLA-3X antenna configuration 220 may be combined with other antennae and/or antenna arrays (not shown). In the embodiment of the CLA-3X antenna configuration 220 shown in FIG. 2C, the antenna elements 225 are closely spaced. The term "closely spaced," as used herein and in accordance with common usage in the art, will be understood to refer to antenna arrays including a plurality of antennae and/or antenna elements that are separated by a distance that is less than or on the order of a characteristic wavelength of a signal that may be transmitted or received by the antennae. For example, the spacing between the antenna elements 225 in the illustrated CLA-3X antenna configuration 220 may be approximately one-half the central wavelength of a wave band that may be transmitted or received by the antenna elements 225 in the CLA-3X antenna configuration 220.

FIG. 2D depicts one embodiment of a uniform linear array (ULA-4V) antenna configuration 230. In the illustrated embodiment, the ULA-4V antenna configuration 230 includes four closely spaced, parallel antenna elements 235. However, the present invention is not limited to this specific configuration. In alternative embodiments, any desirable number of antenna elements and/or individual antennae may be used. Moreover, in some alternative embodiments, the ULA-4V antenna configuration 230 may be combined with other antennae and/or antennae arrays (not shown).

Referring back to FIG. 1, signals 125, 130 from the mobile station 110 may be distorted or otherwise altered as they travel to the antenna array 120. In one embodiment, the alterations may arise in part because mobile station 110 is moving. For example, a user may be using the mobile station 110 while walking, riding in a car, and the like. Doppler spreading of the signals 125, 130 from the moving mobile station 110 may shift the signal frequency and/or cause temporal fading of the signals 125, 130. Alternatively, the antenna array 120 may be in motion. For example, high winds may cause an antenna tower (not shown) supporting the antenna array 120 to sway. Persons of ordinary skill in the art should appreciate that the Doppler spreading of the signals 125, 130 may also be referred to using terms such as "Doppler fading," "Doppler shift," and the like.

The signals 125, 130 may be scattered as they travel from the mobile station 110 to the antenna array 120. In the conceptual illustration shown in FIG. 1, the scattering may include random scattering from many uncorrelated scatterers 135 around the mobile station 110, which may be modeled by a superposition of a large number of signals 125 emanating from uncorrelated scatterers 130. The signals 125, 130 may also be scattered by one or more dominant scatterers 140, such as buildings, mountains, and the like. Persons of ordinary skill in the art should appreciate that the various parameters of the random and/or dominant scatterers 135, 140, such as a size, number, distribution, and/or density of the scatterers 135, 140, may depend upon the environment of the mobile station 110 and/or the antenna array 120. For example, the number and density of scatterers 135, 140 may be much larger in urban environments than in suburban environments.

Scattering of the signals 125, 130 may spread the round-trip time delay of the signals 125, 130, at least in part because of variations in the path length from the mobile station 110 to the antenna array 120. Persons of ordinary skill in the art should appreciate that the round-trip time delay spreading may also be referred to using terms such as "multipath delay spread," and the like. Scattering of the signals 125, 130 may also spread the angle-of-arrival of the signals 125, 130. Persons of ordinary skill in the art should appreciate that the angle spreading may also be referred to using terms such as "angle fading," "spatial fading," "spatial diversity," and the like. In the embodiment depicted in FIG. 1, a nominal angle-of-arrival may be denoted by θ and a random angle deviation from the nominal angle-of-arrival may be denoted by the symbol φ. In one embodiment, scattering of the signals 125, 130 may spread the nominal angle-of arrival such that the angle deviation φ is approximately distributed as a Gaussian or uniformly distributed random variable with variance $\sigma_\phi^2$. The standard deviation $\sigma_\phi$ of the angle deviation is often called the "angle spread" of the signals 125, 130. However, persons of ordinary skill in the art should appreciate that the distribution and/or angle spread of the nominal angle-of-arrival may not always be Gaussian and may depend upon many parameters including, but not limited to, the distribution of the transmitted signals 125, 130, the distribution of the scatterers 135, 140, and the like.

A multipath searcher 150 is communicatively coupled to the antenna array 120. The multipath searcher 150 may determine an increased-accuracy round-trip delay time that may synchronization using the signals 125, 130 using a delay-domain and angle-domain search when the antenna array 120 includes one or more arrays of closely spaced antennae. For example, the multipath searcher 150 may implement a delay-domain and angle-domain search when the antenna array 120 includes the CLA-3X antenna configuration 220 and/or the ULA-4V antenna configuration 230 described above. Consequently, the performance of the multipath searcher 150 may be improved, relative to conventional multipath searchers that use delay-domain searching, by the spatial processing gain. For example, as will be discussed in detail below, simulation results for the ULA-4V antenna configuration 230 indicates that approximately 5-5.5 dB improvements can be obtained compared to the V-1 antenna configuration 200, when the spatial channel environment results in an angle spread of about 2.5°.

Figure 3:
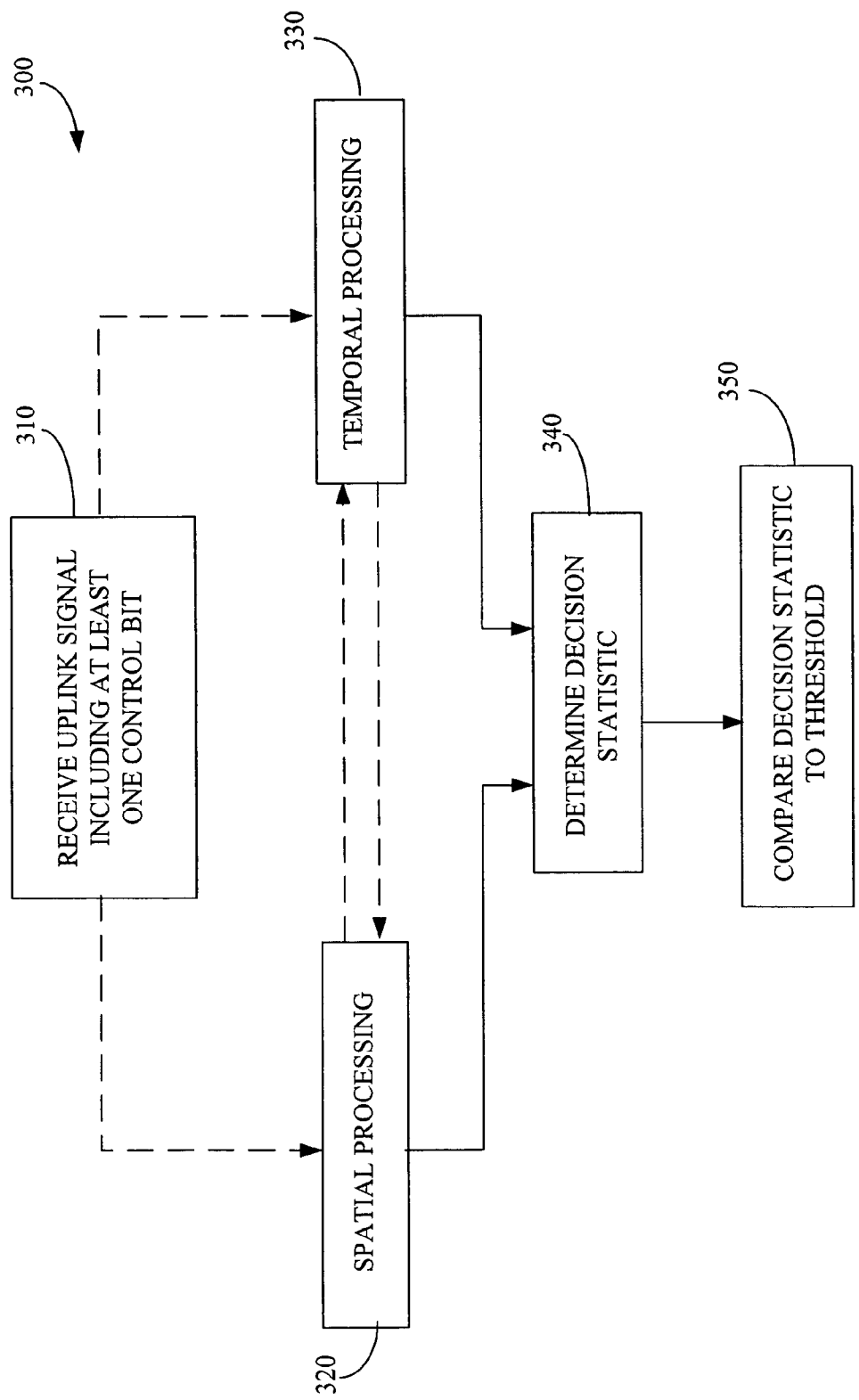
FIG. 3 is a flowchart describing one embodiment of a method of multipath searching that may be used in conjunction with the communication channel shown in FIG. 1.

FIG. 3 is a flowchart describing one embodiment of a method 300 of space-time multipath searching. In the illustrated embodiment, an uplink signal transmitted from a UE is received (at 310) by one or more closely-spaced receive antennae of a Node-B receiver. In one embodiment, the uplink signal may be transmitted on a communication channel such as one of a plurality of dedicated physical control channels, sometimes referred to as a DPCCH. The uplink signal may contain data related to one or more control bits. In various alternative embodiments, the control bits may include a pilot control bit ($N_{pilot}$, $N_{pilot1}$, $N_{pilot2}$), a feedback information bit ($N_{fbi}$), a transport format combination indicator bit ($N_{tfci}$), a transmit power control bit ($N_{tpc}$), and the like. The variable $N_i$ refers to the coherent accumulation length in number of chips for control bit block i. Depending on an estimated frequency, such as may be provided during detection of the RACH preamble, the pilot control bit field can be split into more than one part for coherent integration. For example, when the estimated frequency is low, $N_{pilot}=N_{pilot1}$ and $N_{pilot2}=0$, and when the estimated frequency is high, $N_{pilot1}=N_{pilot2}=N_{pilot}/2$.

As will be described in further detail hereafter, the uplink signal may be subjected to both spatial processing (at 320) and temporal processing (at 330) during the multipath search. The particular order of processing is flexible: spatial processing may occur before temporal processing, and vice versa, as shown by the dotted line arrows in FIG. 3. Temporal processing may include temporal correlation, such as described below, to uncover a scrambling (or channel) code, an orthogonal variable spreading factor, and the like. Temporal processing may also include temporally correlating at least one control bit block associated with the at least one control bit in each of the received uplink signals, as described in detail below. In one embodiment, the temporal correlation may utilize the scrambling (or channel) code, an orthogonal variable spreading factor, and the like In one embodiment, spatial processing may be performed using a direct implementation for spatial processing in which all users (e.g., UEs establishing communication with a Node-B of a given cell) share a single 'spatial processing block' in the Node-B receiver architecture. However, the present invention is not limited to embodiments including direct implementation of spatial processing. For example, in some alternative embodiments, spatial processing including a Fast Fourier Transform may be implemented.

In one embodiment of a direct implementation of spatial processing, the uplink signal may be on a dedicated physical channel and a transmitted signal $s_k(t)$ for a user k may be modeled by equation (1):

$$s_k(t)=A_k c(t) d_k(t) \qquad (1)$$

where $A_k$ is the transmitted signal amplitude of user k; $d_k(t)$ denotes a dedicated traffic and pilot signal of user k after multiplexing, and c(t) is a combined scrambling code and orthogonal variable spreading factor (OVSF) code. The received uplink signal $r_m(t)$ at a receiver antenna m of a Node-B receiver may be defined by equation (2):

$$r_m(t) = \sum_k \sum_l h_{kml} A_k c_k(t - \tau_{kml}) d_k(t - \tau_{kml}) + z_m(t). \qquad (2)$$

In equation (2), $h_{kml}$ represents a channel coefficient of path l for receiver antenna m, $\tau_{kml}$ denotes a time delay of path l for user k, and $z_m(t)$ represents complex Gaussian noise that is spatially and temporally white, denoted as $z \sim CN(0, \sigma^2)$.

For a closely-spaced linear array with M uniformly spaced antenna elements, let r(t) represent the combined uplink signal received by the antenna cluster, $r(t)=[r_0(t)\ r_0(t) \ldots r_{M-1}(t)]^T$, and let $w(\theta_p)$ be a weight vector in the direction of angle $\theta_p$, where p is an angle bin index, p=0, 1, ... P-1 (P denoting the number of beams, or angle bins). For a uniformly spaced linear antenna array, the weight vector may be expressed by equation (3):

$$w(\theta_p) = \frac{1}{\sqrt{M}}[1 \cdot e^{j\Delta \sin\theta_p} \ldots e^{j(M-1)\Delta \sin\theta_p}]^T \quad (3)$$

where $\Delta=2\pi/\lambda$, d is the receive antenna spacing and $\lambda$ is the wavelength of the uplink signal. Disregarding additive noise terms, the signal after spatial processing by direct implementation, spatially processed signal $R(\theta_p)$, may be expressed by equation (4):

$$\begin{aligned} R(\theta_p) &= w_p^H(\theta_p) \cdot r(t) \quad (4) \\ &= \frac{1}{\sqrt{M}} \sum_k \sum_l \sum_{m=0}^{M-1} r_m(t) e^{-jm\Delta\sin\theta_p} \\ &= \frac{1}{\sqrt{M}} \sum_k \sum_l \sum_{m=0}^{M-1} A_k h_{kml} e^{-jm\Delta\sin\theta_p} \\ &\quad c(t - \tau_{kml}) \cdot d_k(t - \tau_{kml}) \end{aligned}$$

For a closely-spaced uniform linear antenna array, the channel coefficient $h_{kml}$ may be represented by equation (5), the terms of which may be substituted for $h_{kml}$ in equation (4) to determine a spatially processed signal $R(\theta_p)$ for a closely-spaced uniform linear antenna array:

$$h_{kl}(\theta) = \alpha_{kl} e^{j\phi_{kl}}[1 \cdot e^{j\Delta\sin\theta} \ldots e^{j(M-1)\Delta\sin\theta}]^T \quad (5)$$

As discussed above, in alternative embodiments, spatial processing may be implemented with a Fast Fourier Transform (FFT) implementation that may reduce computational complexity. For example, when the antenna spacing satisfies $d=\lambda/2$, $\Delta=\pi$, steering angles $\theta_p$ may be selected to satisfy the relation in equation (6):

$$\sin\theta_p = \frac{2p - M + 1}{M}, \quad p = 0, 1, \ldots, P-1. \quad (6)$$

The array vectors thus formed make the orthogonal spatial basis. Accordingly, the signal after spatial processing by FFT implementation, spatially processed signal $R(\theta_p)$ from equation (4), may now be expressed by equation (7):

$$\begin{aligned} R(\theta_p) &= \frac{1}{\sqrt{M}} \sum_{m=0}^{M-1} r_m(t) e^{-jm\pi\left(\frac{2p-M+1}{M}\right)} \quad (7) \\ &= \frac{1}{\sqrt{M}} \sum_{m=0}^{M-1} r_m(t) e^{-j2\pi\frac{mp}{M}} e^{j\pi\frac{m(M-1)}{M}} \end{aligned}$$

The FFT implementation offers savings in computational complexity over direct implementation. Potential savings in complexity may be shown by comparing complex multiply-adds for implementing spatial processing. For M receive antennae and P angle bins (beams), complex multiply-adds required to implement spatial processing by direct implementation is M×P. The FFT implementation, which may be embodied as a radix-2 or radix-4 FFT algorithm with phase correction, for example, requires only $M+(P/2 \times \log_2 M)$ complex multiply-adds. When M=P=4, FFT implementation requires 8 multiply-adds, as compared with 16 multiply-adds for direct implementation. This is a 50% savings in complexity. Since computational complexity for spatial processing may be inherently high, as spatial processing is computed for the incoming uplink signal (which is sampled at 2 times the chip-rate), this 50% saving in complexity may be significant. For a CLA-3X antenna configuration, a radix-3 FFT or other fast FFT algorithm may be used.

In either the direct implementation or the FFT implementation of spatial processing, the output from spatial processing (if performed after temporal correlation) or the output from temporal processing (if performed after spatial processing) is used to determine a decision statistic (at 340), referred to generally as 'Y'. In general, and for each preamble signature in the uplink signal, a decision statistic Y is determined from a non-coherent sum of squared norms (e.g., sum of the squares of the real (I) and imaginary (Q) parts of a subcorrelation output, which is a result of temporal processing).

In one embodiment, hypothesis testing may be carried out to determine whether the signal is present or not. For example, if r(t) denotes a received chip-rate signal, s(t) denotes the signal of interest, and z(t) denotes the additive noise, two types of hypotheses may be defined:

$$H_0: r(t) = z(t)$$

$$H_1: r(t) = s(t)\, h(t) + z(t).$$

A multipath searcher that implements delay-domain and angle-domain searching may then carry out the hypothesis testing for the temporal and angle bins corresponding to each user using the decision statistic, $Y(\tau, \theta)$. For example, partial correlations $s^p_{d,j,i}$ may be obtained by coherent accumulation over one or more control bit blocks. The decision statistic $Y(\tau, \theta)$, also denoted as $Y^p$ for simplicity, may then be calculated using a non-coherent sum of the partial correlations $S^p_{d,j,i}$ over the I control bit blocks, J slots, and $N_{div}$ diversity antennae and/or antenna clusters:

$$\begin{aligned} Y^p &= \sum_{d=0}^{d=N_{div}-1} \sum_{j=0}^{j=J-1} \sum_{i=0}^{i=I-1} |S^p_{d,j,i}|^2 \\ &= \sum_{d=0}^{d=N_{div}-1} \sum_{j=0}^{j=J-1} \sum_{i=0}^{i=I-1} |(\text{Re}\{S^p_{d,j,i}\})^2 + (\text{Im}\{S^p_{d,j,i}\})^2|. \end{aligned}$$

In one embodiment, a squared $L_2$-norm may be used to compute the decision statistic. However, in alternative embodiments, other norms may be used, including $L_2$-norm, approximate $L_2$-norm, $L_1$-norm, and the like. The alternative norms may, in some cases, reduce computational complexity. Persons of ordinary skill in the art should appreciate that the variance of $S^p_{d,j,i}$ is $\sigma^2_i = N_{ci}\sigma^2_c$, where $N_{ci}$ is the correlation length within block i. The estimated time delay $\bar{\tau}$ and angle-of-arrival $\bar{\theta}$ may then be computed using:

$$(\bar{\tau}, \bar{\theta}) = \arg\max Y(\tau, \theta),$$

where the MAX operation is taken over the time delay $\tau$ and angle-of-arrival $\theta$.

The decision statistic having the maximum value may then be compared (at 350) against a given threshold, referred to herein as "q". In one embodiment, the given threshold q may be determined so that as the number of angle bins ($N_{AOA}$ angle bins) increase, the threshold increases, so as to maintain a probability of false alarm $P_{FA}$ over all angle bins at a desired value. $P_{FA}$ is the false alarm probability, a probability that a decision statistic erroneously exceeds the corresponding threshold when the signal is not present. Specific embodiments of the decision statistic and corresponding thresholds will be discussed in detail below.

Figure 4A:
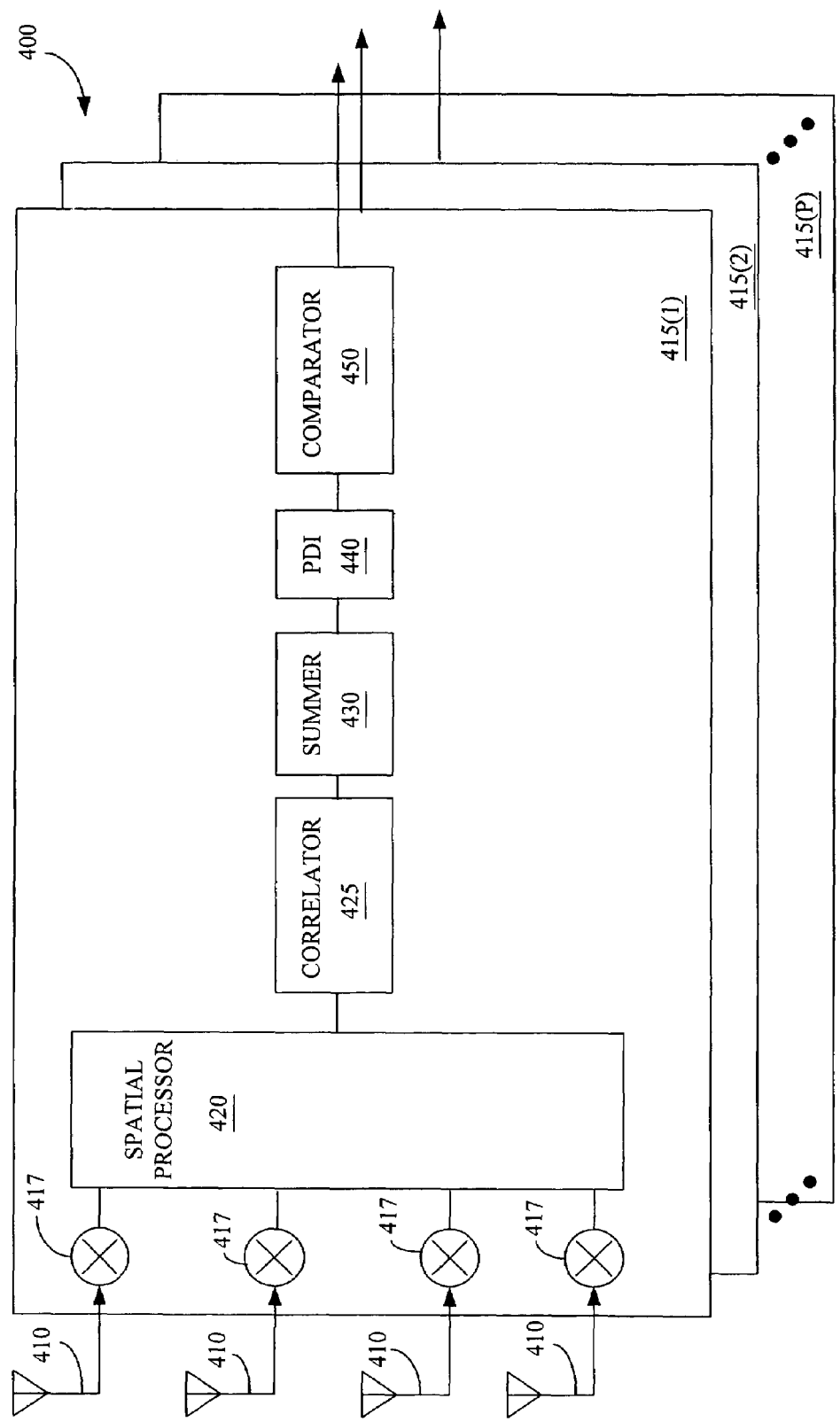
FIGS. 4A, 4B, 4C, and 4D conceptually illustrate alternative embodiments of a multipath searcher that may be used in conjunction with the communication channel shown in FIG. 1.

FIG. 4A is a block diagram of one embodiment of a multipath searcher 400 with direct implementation of a spatial processing block. FIG. 4A implements spatial processing at a level of a chip-rate signal by direct implementation, where a single spatial processing block is shared by all users, e.g., spatial processing is performed for chip-rate signal and done once for all users for each hypothesis. The multipath searcher 400 includes a plurality of antennae 410 which may each receive an uplink signal. The antennae 410 provide the received uplink signal to one or more angle processing units 415(1-P). Each angle processing unit 415(1-P) corresponds to a given angle-of-arrival $\theta_p$, where the index p indicates an angle bin and P indicates the total number of angle bins. In one embodiment, the total number of angle bins is equal to the total number of antennae 410. However, in alternative embodiments, the total number of angle bins may not necessarily be equal to the total number of antennae 410. The received uplink signals are multiplexed by weight vector $w_p^H$ in a multiplexer 417 included in each angle processing unit 415(1-P). The weighted signals are output to a spatial processor 420, which computes a spatially processed signal, as discussed in detail above. The weighted signals are temporally correlated by the correlator 425.

Figure 5:
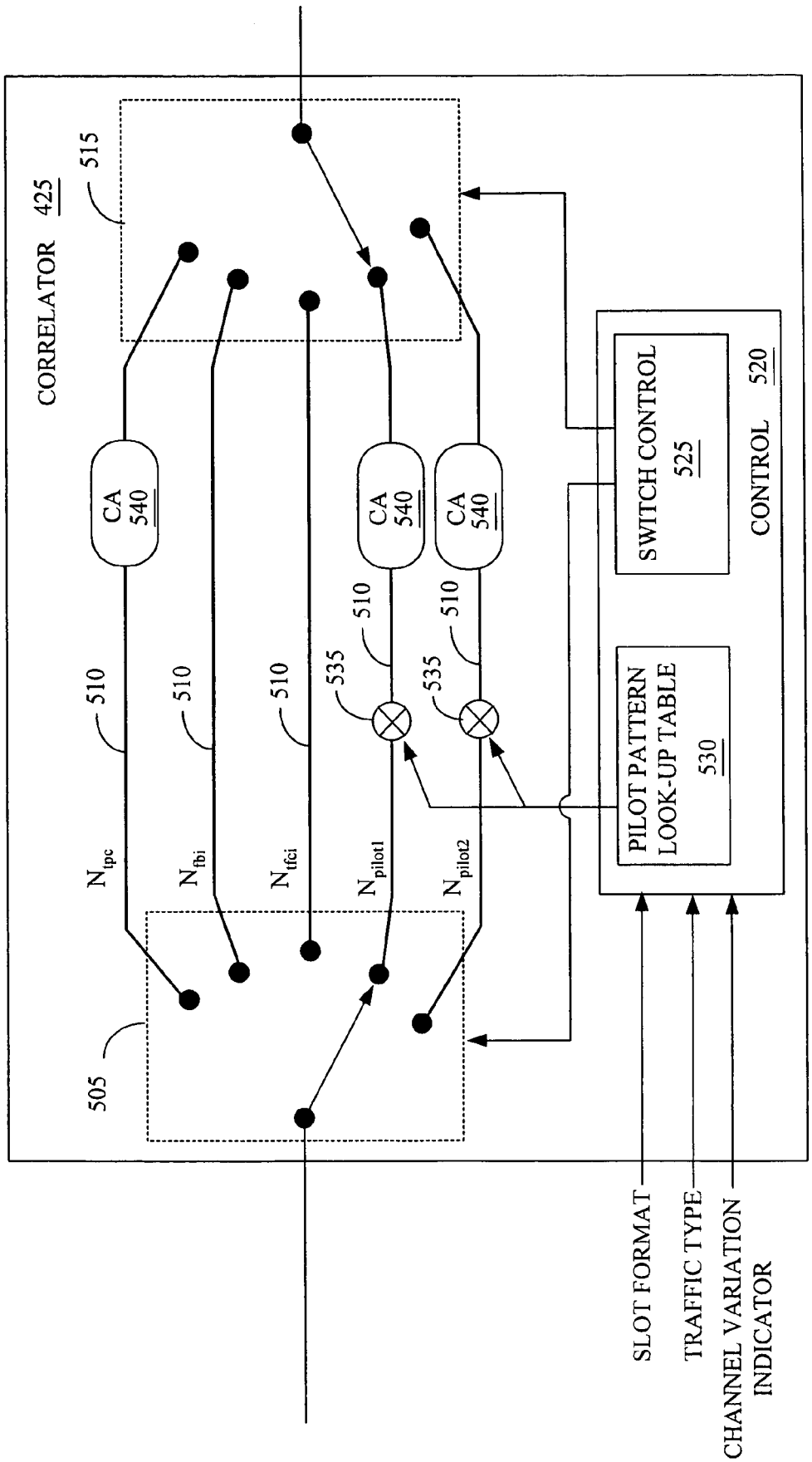
FIG. 5 shows an exemplary embodiment of a correlator that may be used in the multipath searcher shown in FIGS. 4A-D.

FIG. 5 shows an exemplary embodiment of the correlator 425. In the illustrated embodiment, the weighted signal is provided to a switch 505, which is coupled to one or more branches 510 of the correlator 425. Each branch 510 corresponds to a particular type of control bit. For example, various branches 510 shown in FIG. 5 correspond to pilot control bits ($N_{pilot1}$, $N_{pilot2}$), feedback information bits ($N_{fbi}$), transport format combination indicator bits ($N_{tfci}$), and transmit power control bits ($N_{tpc}$). An output signal is provided by a switch 515, which is also coupled to the one or more branches 510.

In the illustrated embodiment, the correlator 425 includes a control unit 520, which may be used to control the operation of the correlator 425. For example, the control unit 520 may include a switch control 525 that may provide a control signal to the switches 505, 515 indicating that the weighted signal should be provided to the first pilot control ($N_{pilot1}$) branch 510 and the output signal should be provided by the first pilot control ($N_{pilot1}$) branch 510. The switches 505, 515 may switch to the appropriate position based upon the received control signal. For another example, the control unit 520 may include a pilot pattern lookup table 530, which may be used to provide a pilot pattern to one or more of the multiplexers 535 for use in the correlation process. In one embodiment, the control unit 520 may receive signals such as a slot format, a traffic type, a channel variation indicator, and the like and may use the signals to control the operation of portions of the correlator 425.

The branches 510 may also include one or more coherent accumulators 540, which may coherently accumulate signals corresponding to control blocks of the one or more control bits. In some alternative embodiments, the antenna array may be part of an antenna cluster, in which case the coherent accumulators 540 may coherently accumulate signals that are coherently accumulated over the one or more antenna elements in an antenna cluster. In one embodiment, the output of coherent accumulators 540 may be one or more of the partial correlations $S^p_{d,ji}$, as described above, which may be obtained by coherent accumulation over one or more control bit blocks.

Referring back to FIG. 4A, an output signal from the correlator 425 is provided to a summer 430. In one embodiment, a non-coherent sum of squared real (I) and imaginary (Q) parts of the output of the correlator 425 is used to compute the decision statistic. The summer 430 may therefore compute the squares to determine the power, $I^2+Q^2$. The summer 430 may then provide the computed power to a post-detection integrator (PDI) 440. In one embodiment, the post-detection integrator 440 computes the decision statistic Y, at a given time delay $\tau$ and angle-of-arrival $\theta$, by non-coherently summing the power over the I control bit blocks, J slots, and $N_{div}$ diversity antennae and/or antenna clusters, as described above. The post-detection integrator 440 then provides the decision statistic to a comparator 450, which compares the decision statistic to a threshold to detect the received uplink signal, as will be discussed in detail below.

Figure 4B:
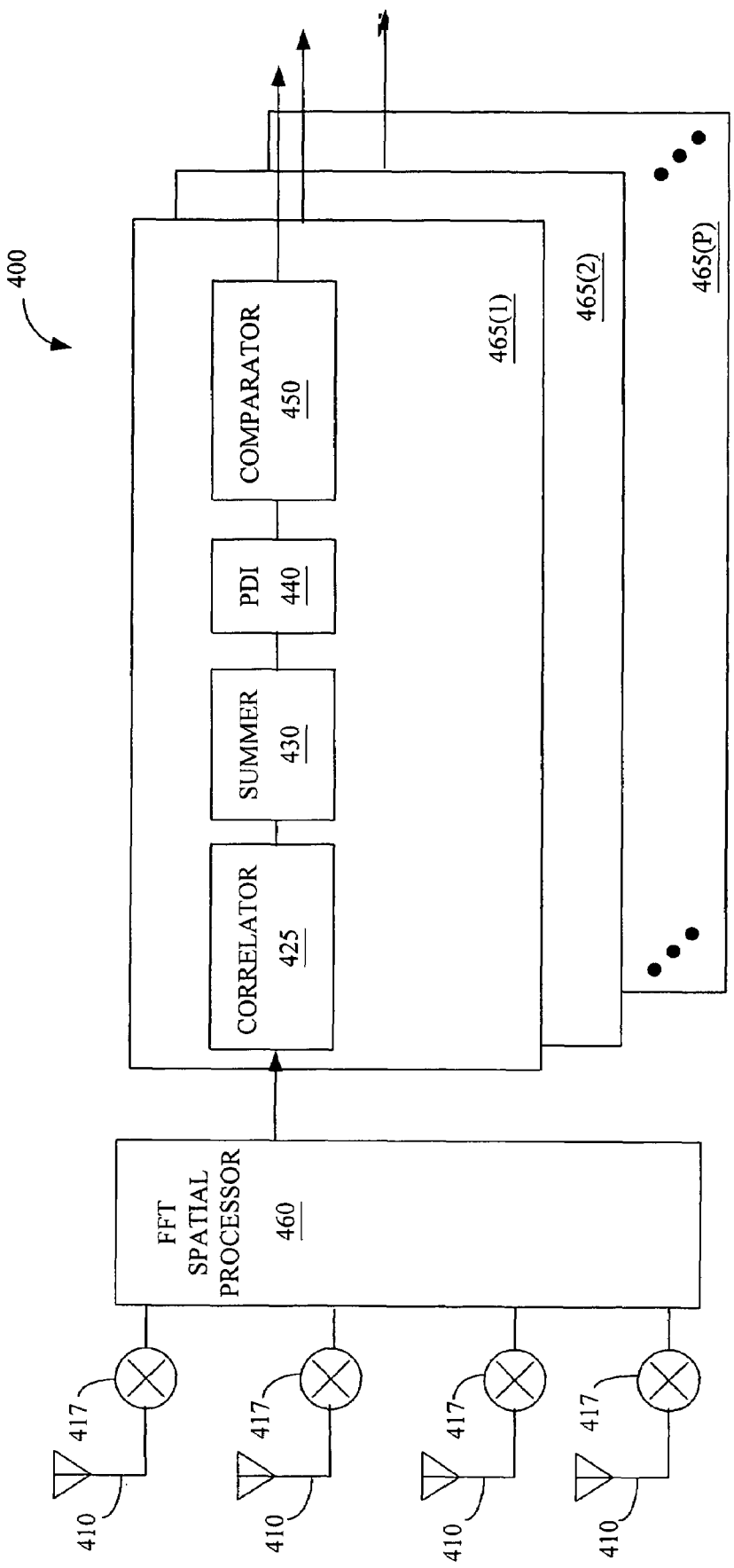
Figure 4C:
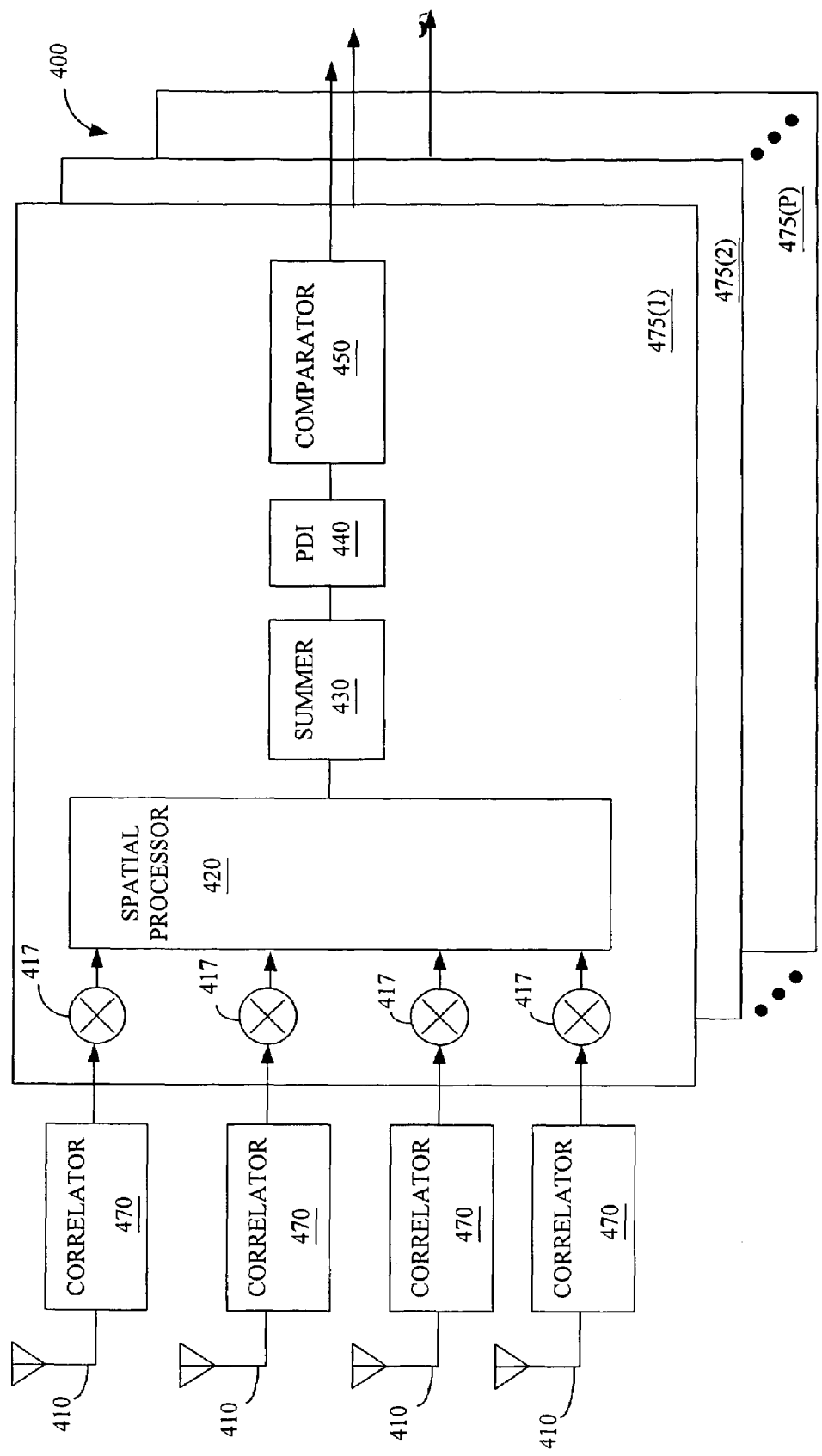
Figure 4D:
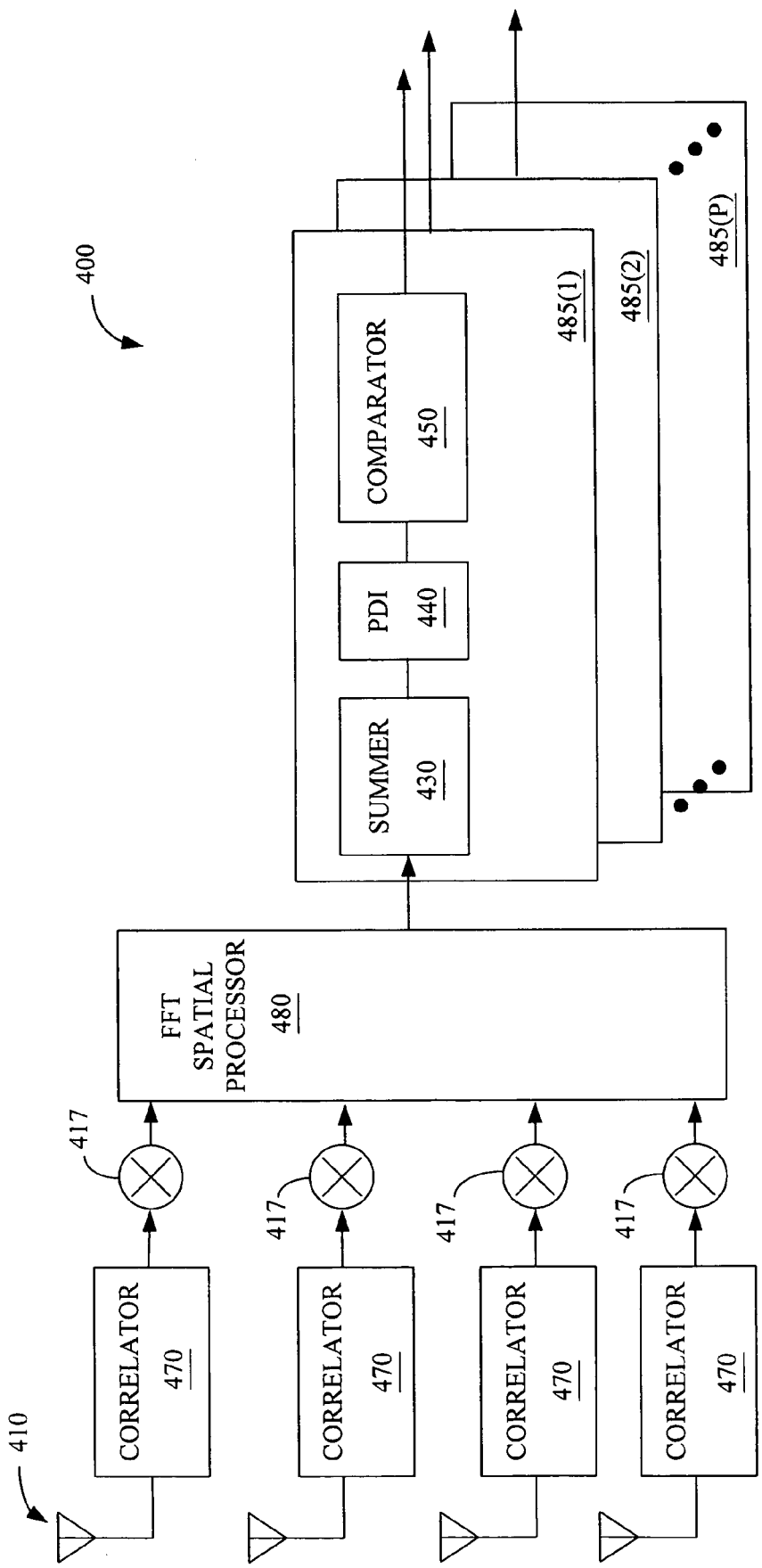

FIGS. 4B, 4C, and 4D are block diagrams of alternative embodiments of the multipath searcher 400. FIG. 4B implements spatial processing at a chip-rate level and employs Fast Fourier Transforms, such as discussed above, in an FFT spatial processor 460 instead of a direct implementation of spatial processing. Output signals from the FFT spatial processor 460 are provided to the angle processing units 465(1-P), which may process the output signals in a manner similar to the processing performed by the angle processing units 415(1-P).

FIG. 4C implements spatial processing at a chip-rate level with direct implementation of a spatial processing block. Since the temporal processing and the spatial processing are linear operations, they can be performed in any order; hence, FIG. 4C is an equivalent structure to FIG. 4A, but is based on performing spatial processing after temporal correlation is derived. In other words, in the embodiment shown in FIG. 4C, spatial processing is performed after a received uplink signal is subjected to temporal processing by correlators 470, which may provide output signals for weighting at multiplexers 415 and spatial processing at spatial processing blocks 420 in the angle processing units 475(1-P). Since the rate of the output signals provided by the correlators 470 is reduced from the chip-rate signal by the coherent accumulation length (the number of chips in a control bit block), the complexity of this 'subcorrelation signal option' is lower than the chip-rate spatial processing option. Output signals from the spatial processor 420 are provided to the other blocks in the angle processing units 475(1-P), which may process the output signals in a manner similar to the processing performed by the angle processing units 415(1-P).

FIG. 4D implements Fast Fourier Transforms, such as discussed above, in the FFT spatial processor 480 and the spatial processing is performed after a received uplink signal is subjected to temporal processing by correlators 470. Output signals from the FFT spatial processor 480 are provided to the other blocks in the angle processing units 485(1-P), which may process the output signals in a manner similar to the processing performed by the angle processing units 415(1-P).

The alternative embodiments shown in FIGS. 4A, 4B, 4C, and 4D use the ULA-4V antenna configuration described above. However, the present invention is not limited to ULA-4V configurations. For example, the alternative embodiments shown in FIGS. 4A, 4B, 4C, and 4D may be implemented using the CLA-3X antenna configuration described above. Moreover, FIGS. 4A and 4B show implementation options based on chip-rate spatial processing before temporal correlation, whereas FIGS. 4C and 4D show embodiments that implement spatial processing after correlation in a temporal dimension. Persons of ordinary skill in the art having benefit of the present disclosure should appreciate that the former structures (ie. FIGS. 4A and 4B) have the advantage of sharing spatial processing for all dedicated physical channel users, and possibly other physical channels that share the same scrambling code. However, computational complexity may be high because processing is repeated for each half-chip rate signal. In embodiments wherein the number of users is smaller than a dedicated physical control channel spreading factor, e.g. a spreading factor of 256, the latter structures (i.e. FIGS. 4C and 4D) may lower the computational complexity. For example the latter structures may lower the computational complexity when the number of angle bins under consideration is larger than the number of antennae.

The potential performance of a multipath searcher that implements spatial and temporal searching may be evaluated using analytical and/or semi-analytical methods. Evaluating the performance of the multipath searcher typically involves determining the probability of a false alarm and determining a probability of a detecting the desired signal. Below, the performance of two embodiments of the present invention will be evaluated. First, the performance of a multipath searcher that utilizes only the aforementioned pilot bits will be evaluated by determining the probability of a false alarm and determining the probability of a detecting the desired signal for the so-called pilot-only multipath searcher. Second, the performance of a multipath searcher that utilizes a plurality of control bits will be evaluated by determining the probability of a false alarm and determining the probability of a detecting the desired signal for the so-called multiple-bit multipath searcher.

For the pilot-only multipath searcher, if the null hypothesis, $H_0$, is assumed, then $\text{Re}\{S_{d,j,i}\}$ and $\text{Im}\{S_{d,j,i}\}$ are uncorrelated and may be approximately determined by $\text{Re}\{S_{d,j,i}\} \approx N(0, N_{pilot}\sigma_c^2/2)$ and $\text{Im}\{S_{d,j,i}\} \approx N(0, N_{pilot}\sigma_c^2/2)$ for i=0. The real and imaginary parts of the partial correlations, $S_{d,j,i}$ are zero for i>0 in the pilot-only multipath searcher embodiment. Therefore, the decision statistic $Y^P$ for each angular bin for the null hypothesis is chi-square distributed with $2JN_{div}$ degrees of freedom. The cumulative distribution function (cdf) of the decision statistic for $H_0$ is given by:

$$F_{Y|H_0(y)} = 1 - e^{-y/\sigma_c^2} \sum_{k=0}^{JN_{div}-1} \frac{1}{k!}\left(\frac{y}{N_{pilot}\sigma_c^2}\right)^k,$$

and for P orthogonal beams, a false alarm probability for a threshold q may be given by:

$$P_{FA} = 1 - [F_{Y^P|H_0}(q)]^P.$$

Under a Neyman-Pearson constraint for false alarm regulation, the threshold q may be determined using an iterative procedure after fixing the false alarm probability to a required value.

The probability of detection of a plane wave arriving at the pilot-only searcher at an angle-of-arrival of $\theta_P$ may be analyzed under the hypothesis $H_1$. Under this hypothesis, $\text{Re}\{S_{d,j,i}\} \approx N(\sqrt{JM_d N^2_{pilot}E_c}, N_{pilot}\sigma_c^2/2)$ and $\text{Im}\{S_{d,j,i}\} \approx N(0, N_{pilot}\sigma_c^2/2)$ for i=0, where $E_c$ is the transmitted chip energy. The real and imaginary parts of the partial correlations, $S_{d,j,i}$ are zero for i>0 in the pilot-only multipath searcher embodiment. Thus, YP is independently and identically distributed and non-central chi-square distributed with $2JN_{div}$ degrees of freedom. The non-centrality parameter, s, and the variance, $\sigma^2$, of the underlying Gaussian random variable are:

$$s^2 = JN_{pilot}^2 E_c \sum_{d=0}^{N_{div}-1} M_d = JN_{pilot}^2 E_c M \text{ and}$$

$$\sigma'^2 = N_{pilot}\frac{\sigma_c^2}{2}.$$

The detection probability in this case is given by:

$$P_{D|h}(q) = \text{Prob}\{Y^0 > q \mid H_1, h\}$$
$$= \{Y^1 > q \mid H_1, h\}$$
$$= \ldots \{Y^{P-1} > q \mid H_1, h\}$$
$$= 1 - \text{Prob}\{Y^0 \leq q \mid H_1\}$$
$$= 1 - F_{Y^P|H_1}(q).$$

The detection probability can also be written as:

$$P_{D|h}(q) = Q_{JN_{div}}\left(\frac{s}{\sigma'}, \frac{\sqrt{q}}{\sigma'}\right)$$
$$= Q_{JN_{div}}\left(\sqrt{2JMN_{pilot}\frac{E_c}{\sigma_c^2}}, \sqrt{\frac{2q}{N_{pilot}\sigma_c^2}}\right),$$

where Q is Marcum's Q-function, such as defined in Digital Communications, J. Proakis, New York, N.Y., McGraw-Hill, $3^{rd}$ ed., 1995.

Figure 6:
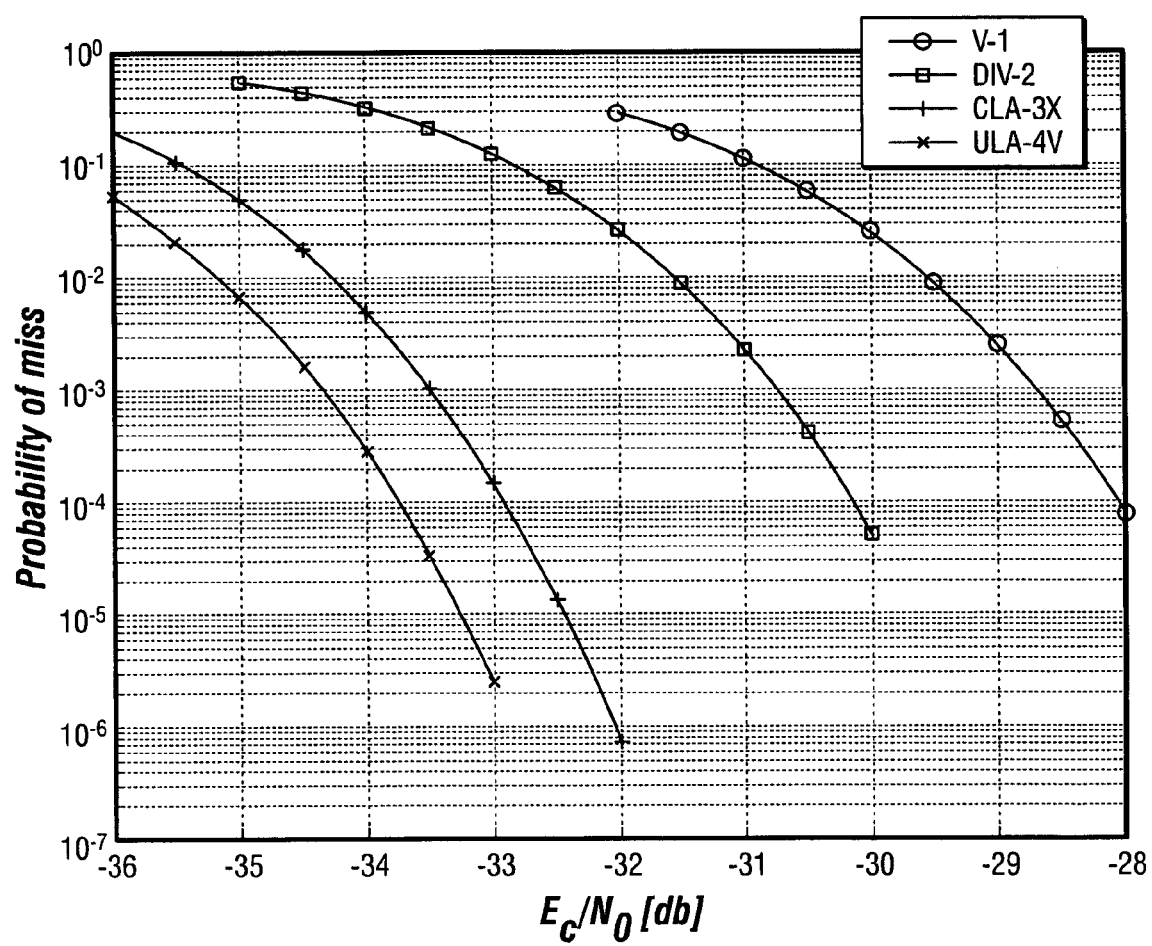
FIG. 6 illustrates the theoretical performance of one embodiment of a pilot-only multipath searcher for a plane wave channel model.

FIG. 6 illustrates the theoretical performance of the pilot-only searcher for the plane wave channel model, assuming uncorrelated channel between antenna clusters. Slot format 1 with $N_{pilot}$=8 per slot was used for this simulation. The simulation results shown in FIG. 6 suggest that under the condition of perfectly correlated antenna clusters, a gain of approximately 2 dB can be obtained with the DIV-2 antenna configuration relative to the V-1 antenna configuration. Comparing ULA-4V and CLA-3X, the ULA-4V antenna configuration performs better that the CLA-3X by approximately 0.8 dB.

The probability of detection for an L-path fading channel can be written in terms of a conditional detection probability conditioned upon channel realization as:

$$P_D(q) = 1 - \int_h \prod_{l=0}^{L-1}\prod_{p=0}^{P-1}\left[1 - Q_{JN_{div}}\left(\sqrt{2N_{pilot}\frac{E_c}{\sigma_c^2}\sum_{d=0}^{N_{div}-1}\sum_{j=0}^{J-1}(w_d^P)R_{h_{d,j},h_{d,j}}w_d^P},\sqrt{\frac{2q}{N_{pilot}\sigma_c^2}}\right)\right]f_H(h)dh,$$

where R indicates the outer product of channel coefficients $h_{d,j}$ and $f_H(h)$ is the probability density function of channel h.

Figure 7A:
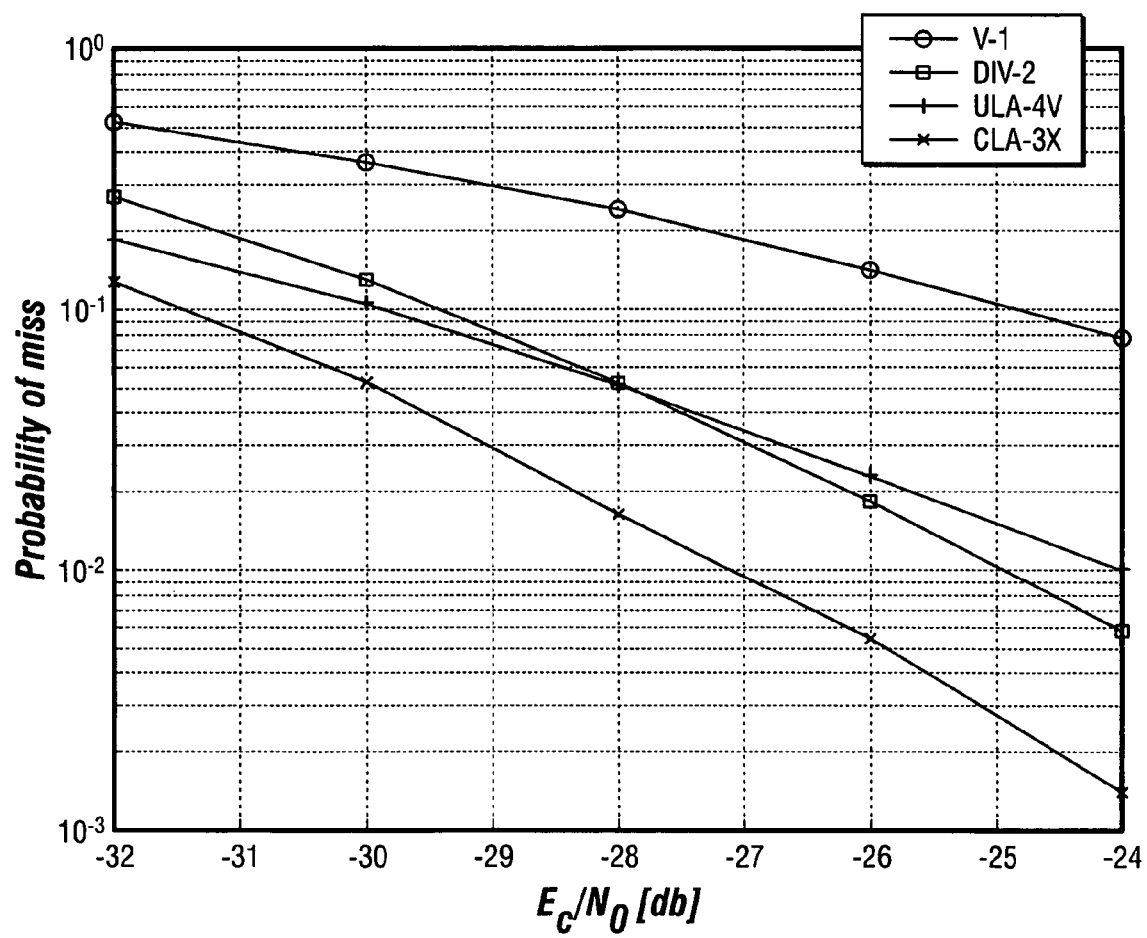
FIGS. 7A and 7B illustrate the simulated performance of one embodiment of the pilot-only multipath searcher for a fading channel model.
Figure 7B:
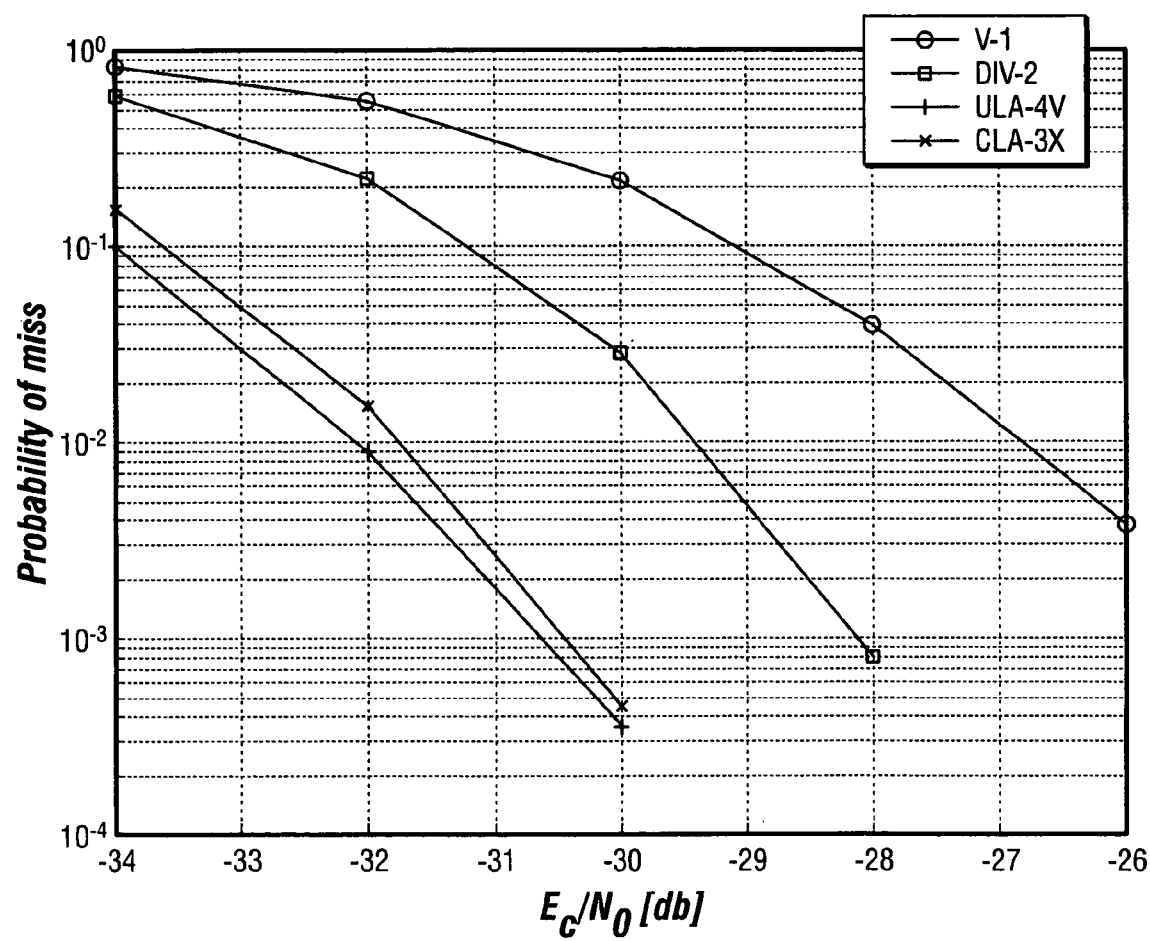

FIG. 7 illustrates the simulated performance of the pilot-only searcher for the fading channel model. Slot format 1 with $N_{pilot}$=8 per slot was used for this simulation. This model assumes a false alarm probability of 0.001 and uses the spatial channel model described in Buehrer, et al, "Spatial channel model and measurements for IMT-2000 systems," IEEE Vehicular Technology conference, pp. 342-346, Spring 2001. The figure shows that for v=120 kmph, the ULA-4V antenna configuration performs better that the CLA-3X antenna configuration by approximately 0.2 dB at $P_M=10^{-2}$. However, for v=3 kmph, CLA-3X and DIV-2 perform better than ULA-4V by 3 dB and 1 dB, respectively. This result, shows that CLA-3X is especially effective for slow-moving vehicles.

In one embodiment, the communication system may impose a requirement on the false alarm probability. For example, in a system with a-false alarm constraint, the threshold value may be set to satisfy the false alarm probability requirement. In one embodiment of a multipath searcher, threshold value may therefore be determined from theoretical false alarm probability. For the multiple-bit multipath searcher, it may be difficult to find a closed-form expression for the probability of a false alarm, $P_{FA}$. In one embodiment, a semi-analytic approach may be used to determine the probability of a false alarm, $P_{FA}$, and the threshold, q, which meets the requirements of a false alarm probability, as discussed above. The following discussion assumes a Slot Form 0. However, persons of ordinary skill in the art having benefit of the present disclosure should appreciate that extension of this analysis to other slot formats is straightforward. Under the null hypothesis, $H_0$, the signal after the coherent accumulation of all pilot bits, as noted here as $S_{pilot}$, is a zero-mean Gaussian random variable with a variance given by $N_{pilot}$ SF $\sigma_c^2/2$, where SF=256. Similarly, a signal after coherent accumulation of TFCI bits

TABLE 1

Statistics of searcher decision metric for null hypothesis (Slot Format 0)

| SIGNAL | i = 0 (Pilot) | I = 1,2 (TFCI) | i = 3 (TPC) |
|---|---|---|---|
| $S_{d,j,i}^P$ | $CN(0, N_{pilot}SF\sigma_c^2)$ | $CN(0, SF\sigma_c^2)$ | $CN(0, N_{TPC}SF\sigma_c^2)$ |
| $Y_i^P = \sum_{d=0}^{N_{div}-1} \sum_{j=0}^{J-1} |S_{d,j,i}^P|^2$ | $\chi_{2JN_{div}}^2$ | $\chi_{2JN_{div}}^2$ | $\chi_{2JN_{div}}^2$ |
| $Y^P = \sum_{i=0}^{I-1} Y_i^P$ | $f_{Y^P}(y) = f_{Y_0^P}(y) * f_{Y_1^P}(y) * \ldots * f_{Y_{I-1}^P}(y)$ | | | and TPC bits, denoted here as $S_{TFCI1}$, $S_{TFCI2}$, and $S_{TPC}$, are zero-mean Gaussian random variables with variances of SF $\sigma_c^2/2$, SF $\sigma_c^2/2$, and $N_{TPC}$ SF $\sigma_c^2/2$, respectively. The probability of a false alarm may be computed by convolving the probability density function of the constituent random variables. The signal statistics and the procedure for computing the probability density function of the searcher decision metric, Y, are set forth in Table 1.

Figure 8A:
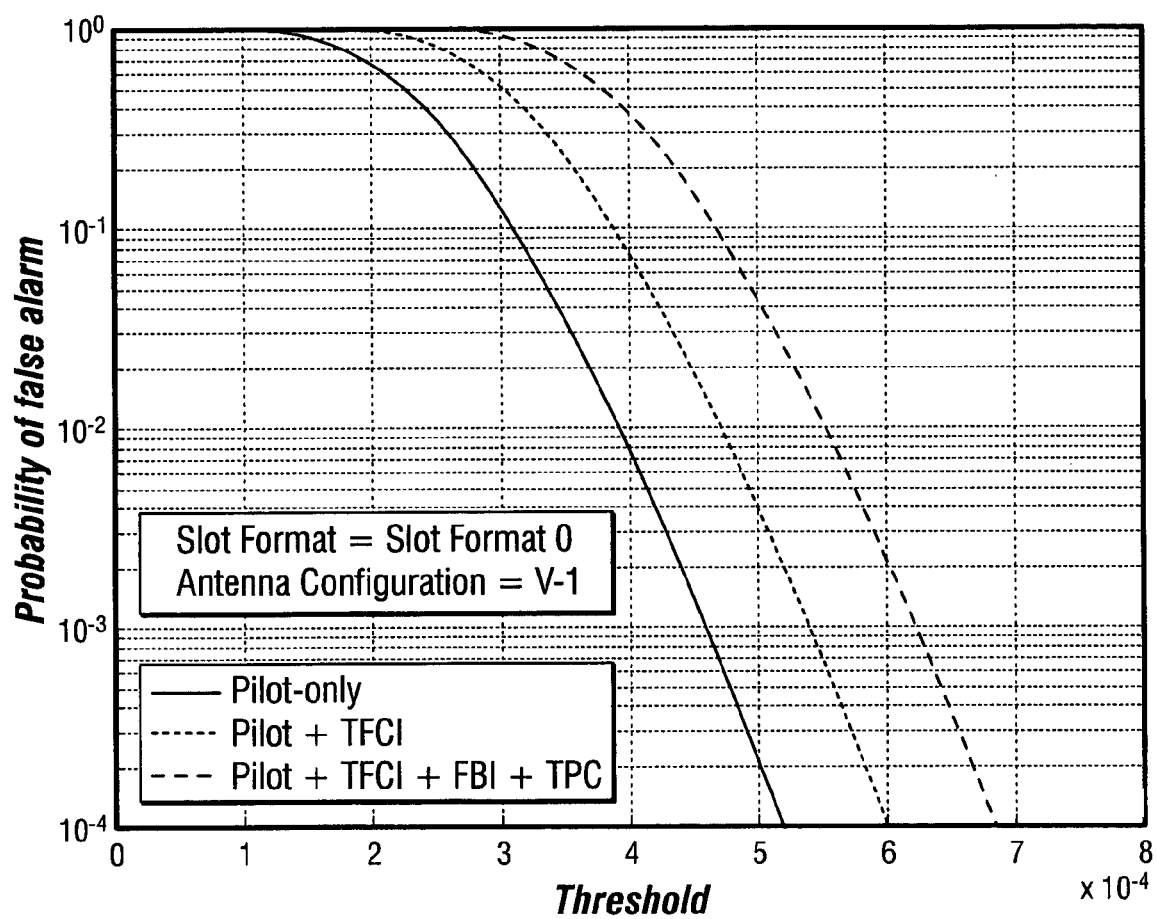
FIGS. 8A and 8B show a simulated false alarm probability for the DIV-2 and CLA-3X antenna configurations shown in FIGS. 2B and 2C, respectively.
Figure 8B:
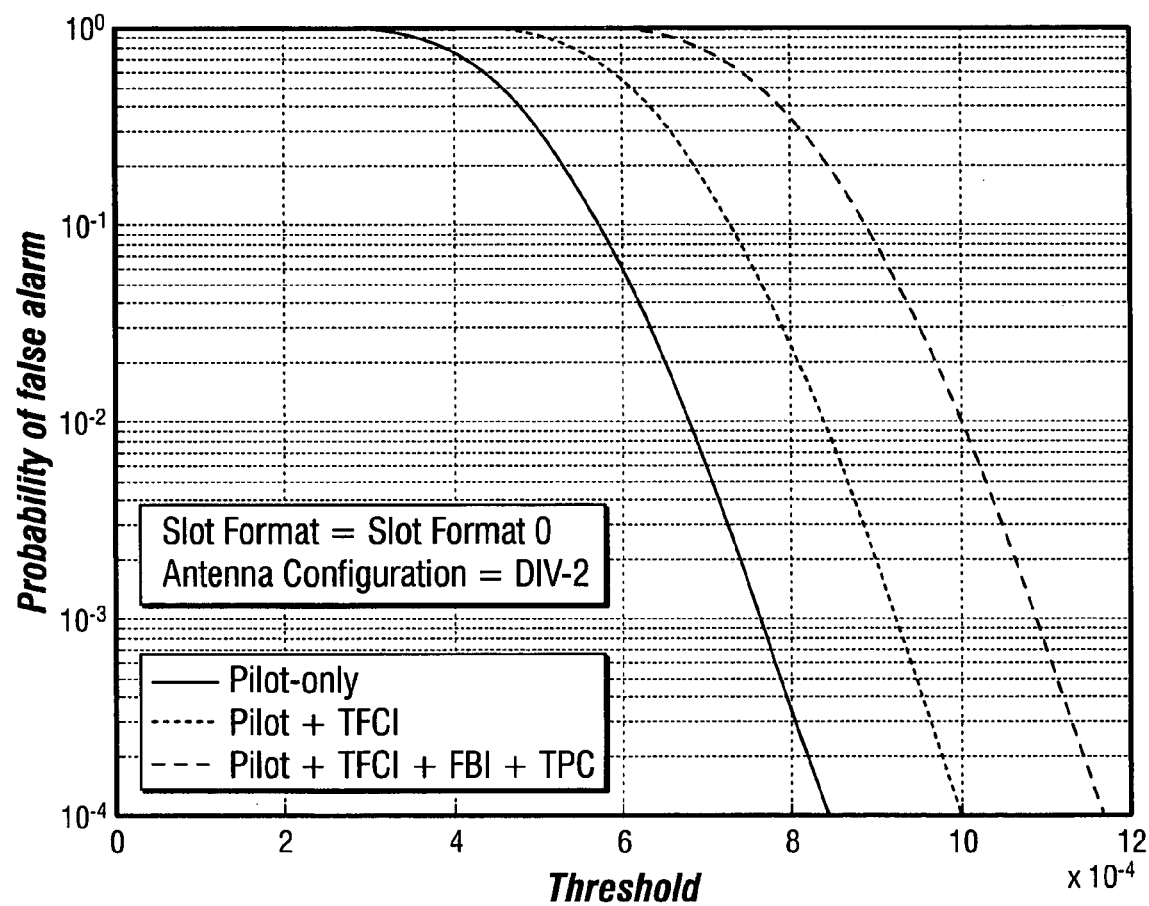

A false alarm probability for each angle bin for a threshold, q, may be obtained from the probability density function of the searcher decision metric, $f_Y(y)$, using the formula:

$$P_{FA}^p(q) = \int_q^\infty f_{Y^P}(y) dy = 1 - \int_0^q f_{Y^P}(y) dy = 1 - F_{Y^P}(q),$$

where $F_{Y^P}(q)$ is the cumulative distribution function of $Y^P$. FIGS. 8A and 8B plot the false alarm probability versus the threshold for Slot Format 0. The false alarm probability for V-1 and ULA-4V antenna configurations is shown in FIG. 8A. FIG. 8B shows the false alarm probability for the DIV-2 and CLA-3X antenna configurations. In the illustrated models, the variance of the chip-rate signal was normalized to $\sigma_c^2=1$.

TABLE 2

Example of mapping between overall $P_{FA}$ and $P_{FA}^P$.

| Antenna Configuration | $P_{FA} = 10^{-3}$ | $P_{FA} = 10^{-4}$ |
|---|---|---|
| V-1 | $10^{-3}$ | $10^{-4}$ |
| DIV-2 | $10^{-3}$ | $10^{-4}$ |
| CLA-3X | $3.3344 \times 10^{-4}$ | $3.3334 \times 10^{-5}$ |
| ULA-4V | $2.5009 \times 10^{-4}$ | $2.5001 \times 10^{-5}$ |

An overall false alarm probability, $P_{FA}$, for P angle bins may be obtained from the relation:

$$P_{FA} = 1 - F_{Y|H_o}(q) = 1 - (1 - P_{FA}^P)^P$$

Thus, $$P_{FA}^P = 1 - (1 - P_{FA})^{1/P}.$$

Table 3 shows an example of the mapping between $P_{FA}$ and $P_{FA}^P$ for Slot Format 0. The threshold that can be used to achieve the required $P_{FA}$ for all angle bins may be obtained by first computing the $P_{FA}^P$ using the above equation. After determining the $P_{FA}^P$, the threshold may be found by looking of the threshold table, such as illustrated in FIG. 8.

Figure 9A:
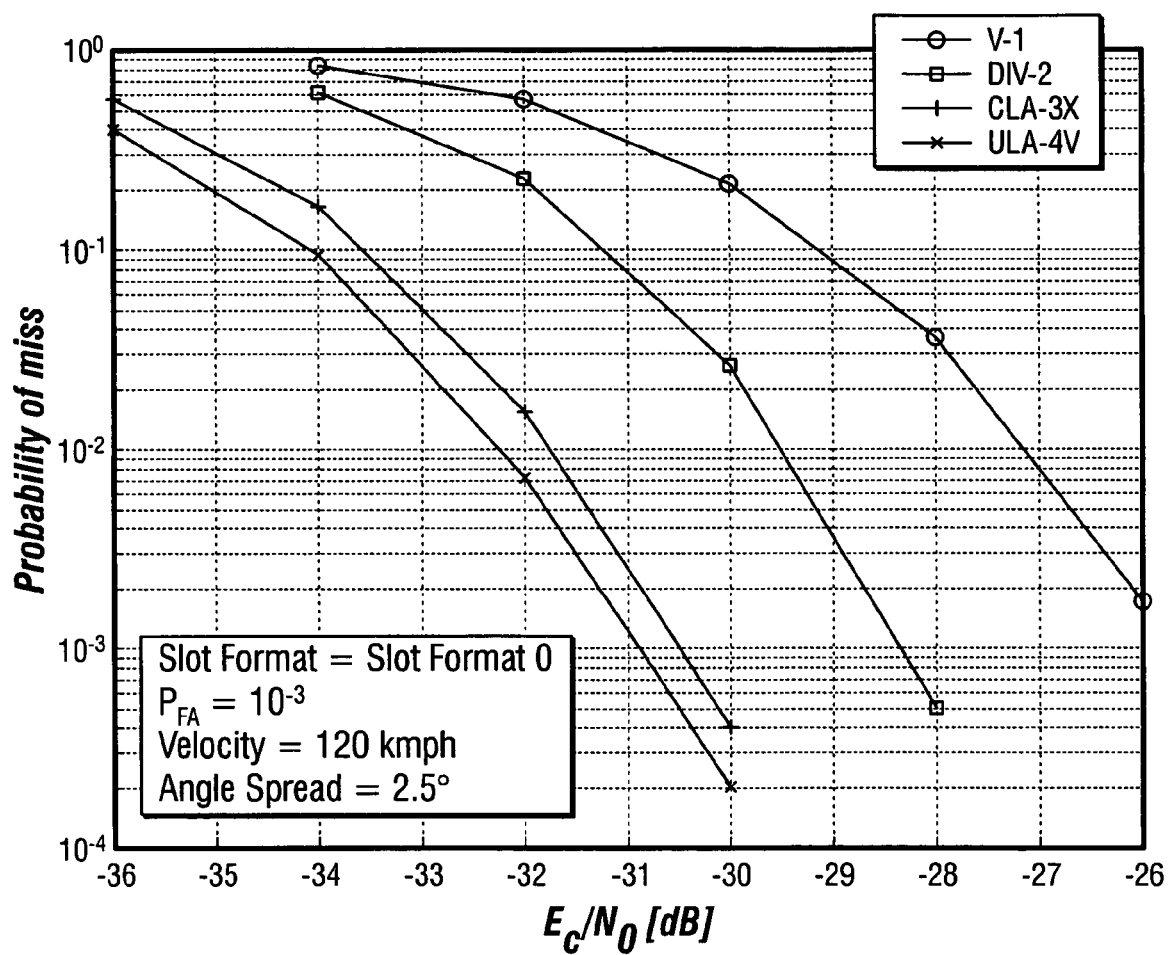
FIGS. 9A and 9B illustrate a simulated performance of a multiple-bit multipath searcher using a fading channel for the antenna configurations V-1, DIV-2, CLA-3X, and ULA-4V shown in FIGS. 2A, 2B, 2C, and 2D, respectively.
Figure 9B:
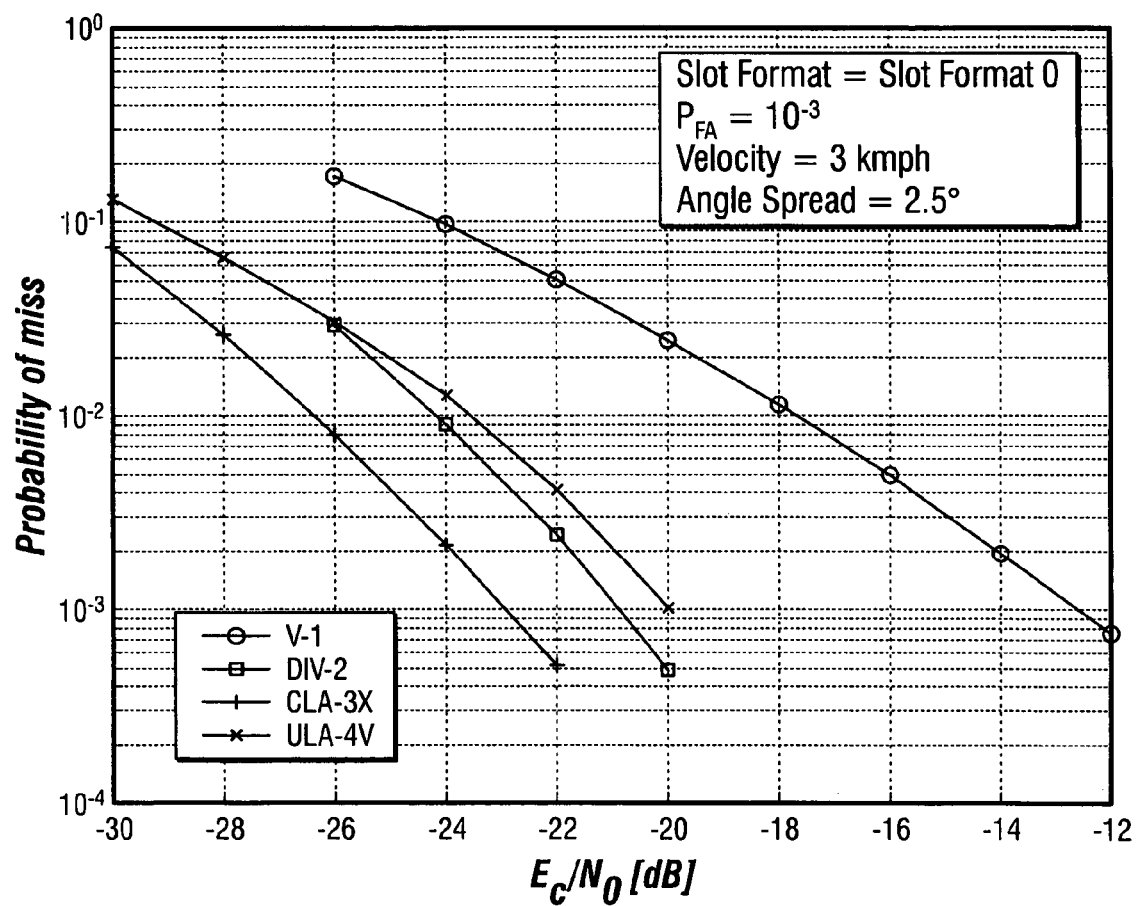

FIGS. 9A and 9B illustrate a simulated performance of a multiple-bit multipath searcher using a fading channel for the antenna configurations V-1, DIV-2, CLA-3X, and ULA-4V. A wideband angle spread of $\sigma_\phi=2.5°$ was selected. The figures demonstrate that for slow mobile devices (v=3 kmph), CLA-3X and DIV-2 outperform the ULA-4V antenna configuration by approximately 1.5 dB and 0.3 dB, respectively, at $P_M=10^{-3}$. For v=120 kmph, the ULA-4V antenna configuration performs better that the CLA-3X antenna configuration by approximately 0.4 dB. For slow mobiles, diversity reception greatly improves the performance of a multiple bit multipath searcher.

Figure 10A:
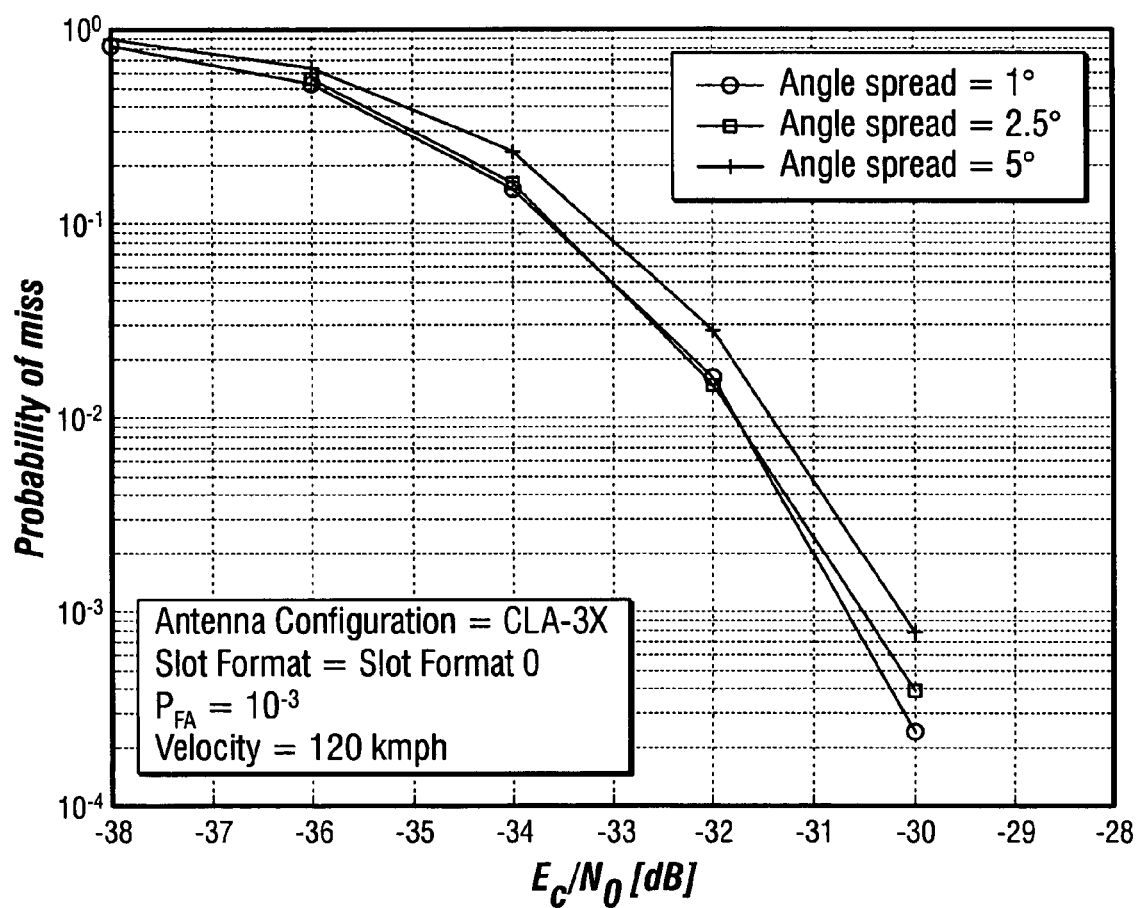
FIGS. 10A and 10B illustrate a simulated performance of a multiple-bit multipath searcher at different angle spreads for the CLA-3X and ULA-4V antenna configurations shown in FIG. 2C and 2D, respectively.
Figure 10B:
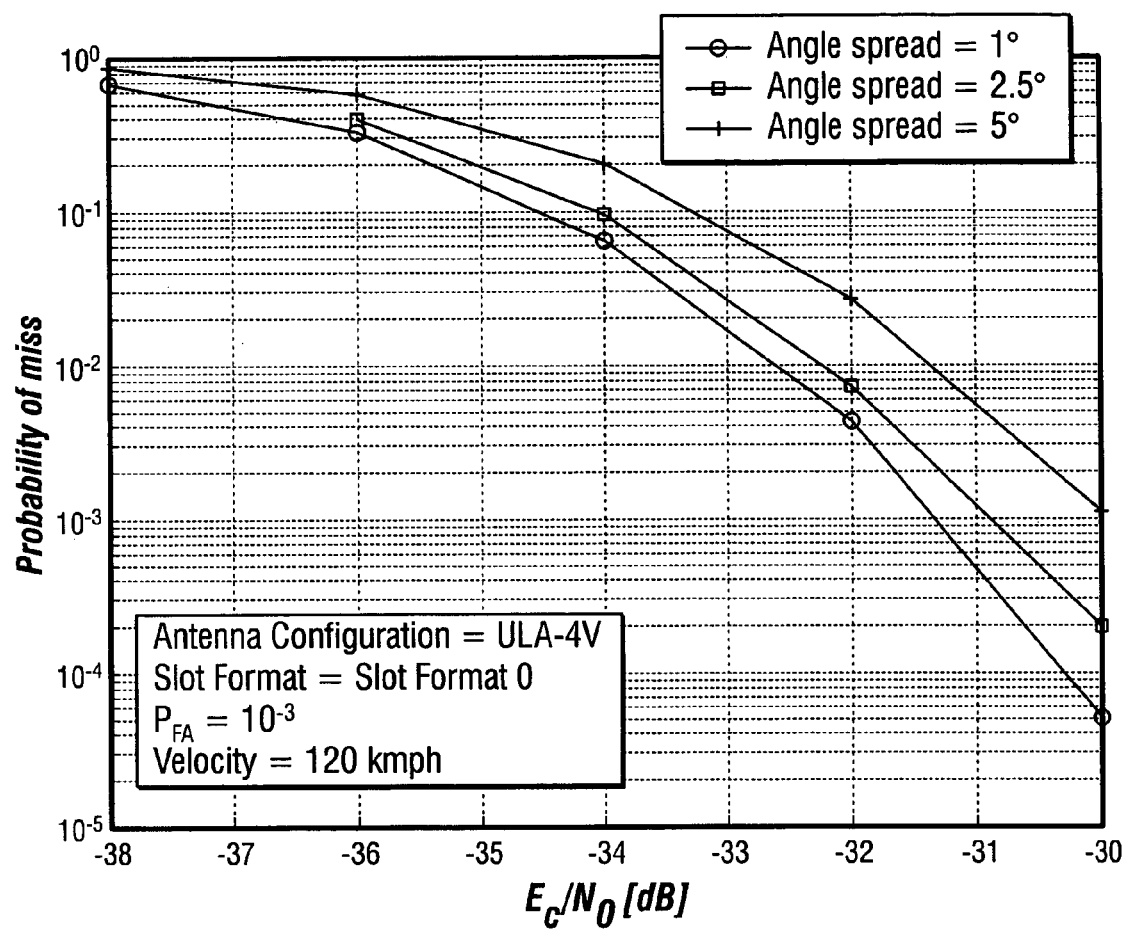

FIGS. 10A and 10B illustrate a simulated performance of a multiple-bit multipath searcher at different angle spreads for the antenna configurations CLA-3X and ULA-4V. The performance of the multiple-bit multipath searcher depends on the angle spread. Detection performance for angle spreads $\sigma_{100}=1°, 2.5°, 5°$ are shown in FIG. 10A (CLA-3X) and FIG. 10B (ULA-4V). The ULA-4V is more sensitive to angle spread variation than CLA-3X. For the CLA-3X antenna configuration, very little performance difference exists between 1° and 2.5°, and a performance difference of approximately 0.3-0.4 decibels appears as the angle spread increases from 2.5° to 5°. For the ULA-4V, performance degradation increases as the angle spread increases. The performance degradation increases from approximately 0.5 decibels to about one decibel as the angle spread increases from 1° to 5°. This result is summarized in Table 4.

TABLE 4 performance degradation due to angle spread.
Reference performance is $\sigma_\phi = 1°$.

| Antenna Configuration | $\sigma_\phi = 1°$ | $\sigma_\phi = 2.5°$ | $\sigma_\phi = 5°$ |
|---|---|---|---|
| CLA-3X | 0 dB | approx. 0 dB | 0.3-0.4 dB |
| ULA-4V | 0 dB | 0.5 dB | 1 dB |

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of multipath searching using a signal transmitted by a source and received by a plurality of antennae, comprising:
  subjecting at least one control bit in at least one received signal to temporal processing;
  subjecting the at least one control bit in the received signal to spatial processing, wherein subjecting the at least one control bit in the received signal to spatial processing comprises applying an angular weight vector to the received signal, and wherein applying the angular weight vector to the received signal comprises applying the angular weight vector to the received signal using a Fast Fourier Transform; and
  determining a time delay and a direction associated with the source based upon the temporal processing and the spatial processing.

2. The method of claim 1, wherein subjecting each of the control bits to temporal processing comprises subjecting each of the control bits to temporal processing substantially before subjecting each of the control bits to spatial processing.

3. The method of claim 1, wherein subjecting each of the control bits to spatial processing comprises subjecting each of the control bits to spatial processing substantially before subjecting each of the control bits to temporal processing.

4. The method of claim 1, wherein subjecting the at least one control bit in the received signal to temporal processing comprises subjecting at least one of a pilot control bit, a feedback information bit, a transport format combination indicator bit, and a transmit power control bit in at least one received uplink dedicated physical control channel to temporal processing.

5. The method of claim 1, wherein subjecting the at least one control bit in the received signal to spatial processing comprises subjecting at least one of a pilot control bit, a feedback information bit, a transport format combination indicator bit, and a transmit power control bit in at least one uplink dedicated physical control channel to spatial processing.

6. The method of claim 1, wherein determining the time delay and the direction associated with the source comprises determining whether a received signal includes only noise or the received signal includes noise and the received uplink signal.

7. The method of claim 6, wherein determining the time delay and the direction associated with the received signal comprises:
  forming at least one decision statistic based upon the temporal processing and the spatial processing; and
  comparing the at least one decision statistic with at least one corresponding threshold.

8. The method of claim 7, wherein forming the at least one decision statistic comprises forming a plurality of partial correlations by coherently accumulating at least one control bit block corresponding to the at least one control bit in the received signal.

9. The method of claim 8, wherein forming the at least one decision statistic comprises non-coherently summing the plurality of partial correlations.

10. The method of claim 1, wherein applying the angular weight vector to the received signal comprises applying the angular weight vector to the received signal at a chip or a sub-chip rate.

11. A method of multipath searching using a signal transmitted by a source and received by a plurality of antennae, comprising:
  subjecting at least one control bit in at least one received signal to temporal processing, wherein subjecting the at least one control bit in the received signal to temporal processing comprises temporally correlating at least one control bit block associated with the at least one control bit in the received signal;
  subjecting the at least one control bit in the received signal to spatial processing, wherein subjecting the at least one control bit in the received signal to temporal processing comprises performing a post-detection integration by non-coherently summing at least one signal representative of the at least one control bit block; and
  determining a time delay and a direction associated with the source based upon the temporal processing and the spatial processing.

12. The method of claim 1, wherein determining the direction associated with the source comprises determining an angle-of-arrival associated with the source.

13. A method, comprising:
  forming a first signal by spatially processing at least one control bit in at least one received signal based upon at least one angle, wherein forming the first signal by spatially processing the at least one control bit in the received signal based upon the at least one angle comprises applying at least one angular weight vector associated with the at least one angle to the received signal, and wherein forming the first signal by spatially processing the at least one control bit in the received uplink signal comprises applying a fast Fourier transform to the at least one angle-weighted received signal;
  forming a second signal by temporally processing the first signal; and
  determining a time delay and a direction associated with the source based upon the second signal.

14. A method, comprising:
  forming a first signal by spatially processing at least one control bit in at least one received signal based upon at least one angle;
  forming a second signal by temporally processing the first signal, wherein forming the second signal by temporally processing the first signal comprises:
    temporally correlating at least one control bit block associated with the at least one control bit in the received uplink signal to form a third signal; and
    forming the second signal by a post-detection integration using the third signal; and
  determining a time delay and a direction associated with the source based upon the second signal.

15. The method of claim 14, wherein temporally correlating the at least one control bit block associated with the at least one control bit in the received uplink signal comprises temporally correlating the at least one control bit block associated with the at least one control bit in the received uplink signal using at least one channel code.

16. The method of claim 14, wherein determining the time delay and the direction associated with the source based upon the second signal comprises:

forming at least one decision statistic using the second signal; and comparing the at least one decision statistic with at least one corresponding threshold.

17. A method of multipath searching using a signal transmitted by a source and received by a plurality of antennae, comprising:

forming at least one first signal by temporally correlating at least one control bit in at least one received uplink signal;

forming a second signal by spatially processing the at least one first signal based upon at least one angle, wherein forming the second signal by spatially processing the first signal based upon the at least one angle comprises forming at least one angle-weighted signal by applying at least one angular weight vector associated with the at least one angle to the at least one first signal, wherein forming the second signal comprises applying a fast Fourier transform to the at least one angle-weighted signal; and determining a time delay and a direction associated with the source based upon the second signal.

18. The method of claim 17, wherein forming the first signal by temporally correlating at least one control bit in the received uplink signal comprises forming the first signal by temporally correlating at least one control bit in the received signal using at least one channel code.

19. The method of claim 17, wherein forming the second signal comprises summing the angle-weighted signals.

20. The method of claim 17, wherein determining the time delay and the direction associated with the source based upon the second signal comprises:

forming a third signal by a post-detection integration using the second signal;

forming at least one decision statistic using the third signal; and comparing the at least one decision statistic with at least one corresponding threshold.

* * * * *